(12) United States Patent
Cruse et al.

(10) Patent No.: US 6,635,700 B2
(45) Date of Patent: Oct. 21, 2003

(54) MINERAL-FILLED ELASTOMER COMPOSITIONS

(75) Inventors: Richard W. Cruse, Yorktown Heights, NY (US); Martin J. Hannon, Bethany, CT (US); Prashant G. Joshi, White Plains, NY (US); Frederick D. Osterholtz, Pleasantville, NY (US); Robert J. Pickwell, Erie, NY (US)

(73) Assignee: Crompton Corporation, Middlebury, CT (US)

( * ) Notice: Subject to any disclaimer, the term of this patent is extended or adjusted under 35 U.S.C. 154(b) by 122 days.

(21) Appl. No.: 09/736,301

(22) Filed: Dec. 15, 2000

(65) Prior Publication Data

US 2002/0115767 A1 Aug. 22, 2002

(51) Int. Cl.$^7$ .............................. C08K 5/5419
(52) U.S. Cl. ................... 524/262; 524/225; 524/261; 524/265; 524/269; 524/280; 524/282; 524/418; 523/213
(58) Field of Search ................. 524/225, 261, 524/262, 265, 269, 280, 282, 418; 523/213

(56) References Cited

U.S. PATENT DOCUMENTS

| | | | |
|---|---|---|---|
| 3,873,489 A | 3/1975 | Thurn et al. .............. 260/33.6 |
| 3,946,059 A | 3/1976 | Janssen et al. ........... 260/448.2 |
| 3,957,718 A | 5/1976 | Pochert et al. ............... 260/38 |
| 3,997,356 A | 12/1976 | Thurn et al. ............... 106/288 |
| 4,125,552 A | 11/1978 | Speier ..................... 260/448.8 |
| 4,184,998 A | 1/1980 | Shippy et al. ............ 260/42.15 |
| 4,222,915 A | 9/1980 | Wolff et al. ............... 260/23.7 |
| 4,229,333 A | 10/1980 | Wolff et al. ............... 260/23.7 |
| 4,279,449 A | 7/1981 | Martin et al. ................ 305/35 |
| 4,375,988 A | 3/1983 | Mueller et al. ............ 106/273 |
| 4,430,466 A * | 2/1984 | Cooper ...................... 523/213 |
| 4,444,936 A | 4/1984 | Schwarz et al. ............ 524/393 |
| 4,514,231 A | 4/1985 | Kerner et al. .............. 106/309 |
| 4,517,336 A | 5/1985 | Wolff et al. ................ 524/571 |
| 4,519,430 A | 5/1985 | Ahmad et al. .............. 152/209 |
| 4,524,169 A | 6/1985 | Wolff et al. ................ 524/263 |
| 4,704,414 A | 11/1987 | Kerner et al. .............. 523/213 |
| 4,820,751 A | 4/1989 | Takeshita et al. .......... 523/215 |
| 5,037,872 A | 8/1991 | Schwarze et al. .......... 524/262 |
| 5,116,886 A | 5/1992 | Wolff et al. ................ 523/209 |
| 5,159,009 A | 10/1992 | Wolff et al. ................ 524/495 |
| 5,227,425 A | 7/1993 | Rauline ..................... 524/493 |
| 5,399,739 A | 3/1995 | French et al. .............. 556/427 |
| 5,401,789 A | 3/1995 | Wolff et al. ................ 524/188 |
| 5,605,951 A | 2/1997 | Sandstrom et al. ........ 524/494 |
| 5,650,457 A | 7/1997 | Scholl et al. ............... 524/262 |
| 5,672,639 A | 9/1997 | Corvasce et al. ............ 524/52 |
| 5,674,932 A | 10/1997 | Agostini et al. ............ 524/430 |
| 5,679,728 A | 10/1997 | Kawazura et al. .......... 523/215 |
| 5,698,619 A | 12/1997 | Cohen et al. ............... 524/188 |
| 5,719,207 A | 2/1998 | Cohen et al. ............... 524/213 |
| 5,723,529 A | 3/1998 | Bernard et al. ............. 524/492 |
| 5,728,778 A | 3/1998 | D'Sidocky et al. ....... 525/330.4 |
| 5,733,963 A | 3/1998 | Sandstrom et al. ........ 524/492 |
| 5,753,732 A | 5/1998 | Wideman et al. ........... 524/263 |
| 5,770,754 A | 6/1998 | Scholl ....................... 556/427 |
| 5,817,852 A | 10/1998 | Ichinohe et al. ............ 556/427 |
| 6,127,468 A * | 10/2000 | Cruse et al. ................ 524/225 |
| 6,251,976 B1 | 6/2001 | Scholl et al. ............... 524/386 |
| 6,342,560 B1 * | 1/2002 | Okel ......................... 524/493 |
| 6,414,061 B1 * | 7/2002 | Cruse et al. ................ 524/262 |

FOREIGN PATENT DOCUMENTS

| | | |
|---|---|---|
| AU | 10082/97 | 7/1997 |
| CA | 2146333 | 4/1994 |
| CA | 2231302 | 9/1998 |
| DE | 2360471 A1 | 6/1975 |
| DE | 2536674 A1 | 2/1977 |
| DE | 2819638 A1 | 11/1979 |
| DE | 2856229 A1 | 3/1980 |
| DE | 2848559 A1 | 5/1980 |
| DE | 3028365 A1 | 2/1982 |
| DE | 3205373 A1 | 8/1984 |
| DE | 3314742 A1 | 10/1984 |
| DE | 3437473 A1 | 4/1986 |
| DE | 4023537 A1 | 1/1992 |
| DE | 4119959 A1 | 12/1992 |
| DE | 4128203 C1 | 5/1993 |
| DE | 4236218 A1 | 6/1993 |

(List continued on next page.)

OTHER PUBLICATIONS

Manual for the Rubber Industry, Bayer, 2nd fully revised edition, Bender et al., 1993, forward, 3 pages.

The Vanderbilt Rubber Handbook, Thirteenth Edition, 1990, pp. 344–347.

*Primary Examiner*—David W. Wu
*Assistant Examiner*—Henry S. Hu
(74) *Attorney, Agent, or Firm*—Michael P. Dilworth

(57) ABSTRACT

A composition of matter is disclosed wherein the composition comprises:

A) at least one latent mercaptosilane coupling agent; and

B) at least one additional mercaptan.

Preferably, the composition comprises:

A) at least one sulfur vulcanizable rubber;

B) at least one latent mercaptosilane coupling agent;

C) at least one latent mercaptosilane activator;

D) at least one filler; and, optionally,

E) at least one additional mercaptosilane.

A two pass process for preparing cured articles, such as tires and/or tire treads, which employs the composition is also disclosed.

15 Claims, No Drawings

FOREIGN PATENT DOCUMENTS

| | | |
|---|---|---|
| DE | 4225978 C1 | 4/1994 |
| DE | 4308311 A1 | 9/1994 |
| DE | 19702046 A1 | 1/1998 |
| EP | 45363 | 2/1982 |
| EP | 126186 | 11/1984 |
| EP | 126871 | 12/1984 |
| EP | 313890 | 6/1992 |
| EP | 0631982 A2 | 1/1995 |
| EP | 0680997 A1 | 11/1995 |
| EP | 0732362 A1 | 9/1996 |
| EP | 0738748 A1 | 10/1996 |
| EP | 0764687 A1 | 3/1997 |
| EP | 0784072 A1 | 7/1997 |
| EP | 0795577 A1 | 9/1997 |
| EP | 0864605 A2 | 9/1998 |
| EP | 0919559 A2 | 6/1999 |
| JP | 63-270751 | 11/1988 |
| WO | 98/53004 | 11/1998 |
| WO | WO 99/09036 | 2/1999 |
| WO | 00/05300 | 2/2000 |
| WO | 00/05301 | 2/2000 |

* cited by examiner

MINERAL-FILLED ELASTOMER COMPOSITIONS

BACKGROUND OF THE INVENTION

1. Field of the Invention

The present invention relates to the preparation and processing of mineral-filled elastomers. More particularly, the present invention relates to a process for the preparation of elastomer compositions comprising inorganic fillers, latent mercaptosilane coupling agents, mercaptosilane coupling agents, latent-mercaptosilane activators, and organic polymers containing carbon—carbon double bonds.

2. Description of Related Art

In the preparation of mineral-filled elastomer compositions, it is known to use as the coupling agent a polysulfide silane in which two alkoxysilyl groups are bound, each to one end of a chain of sulfur atoms. These coupling agents function by chemically bonding silica or other mineral fillers to the polymer when used in rubber applications in a relatively simple and straightforward manner. Coupling is accomplished by chemical bond formation between the silane sulfur and the polymer and by hydrolysis of the silane alkoxy groups, followed by condensation with silica hydroxyl groups.

WO 98/53004 discloses that polysulfide silanes can be used as part of a mineral-treatment process and that these fillers can then be used to prepare rubber masterbatches that are, or can subsequently be, converted to mineral-filled rubber.

Canadian 2231302 A1 also describes the preparation of mineral-filled elastomers containing polysulfide silanes.

U.S. Pat. No. 3,957,718 discloses silica containing mixtures for the improvement of the adhesion of vulcanizable mixtures of natural and/or synthetic rubber to reinforcing fillers or supports of textile and/or metallic fabrics after the vulcanization are prepared that substantially consist of (A) active synthetically produced silica or silicates having a specific surface area according to the BET procedure of about 50 to 500 $m^2/g$ and an average primary particle size of from about 5 to 100 and at least one of (B) phenolic resin or aminoplast forming components, namely on the one hand phenols and/or amines and on the other hand aldehydes or aldehyde donors, and/or at least (C) one organosilane which can be a bisalkoxysilylalkyl-oligosulfide of a specified formula.

U.S. Pat. No. 4,184,998 discloses the bonding of rubber or other plastics to mineral reinforcements, such as silica pigment. The bonding is brought about by a mercapto alkyl silane without production of foul odors from the mercapto compound by preliminary reversible coupling of the mercapto compound with a material capable of addition reaction, such as toluene diisocyanate. However, the reversible decomposition of the addition product generates toxic isocyanates and poses a health risk to people.

U.S. Pat. No. 4,519,430 discloses a pneumatic radial tire with a tread having from one part by weight of hydrated amorphous fine-particle silica per three parts of carbon black tread reinforcing filler, to about three parts by weight of the silica to one part of the carbon black. The amount of silica present is preferably in the range from about 18 parts to about 50 parts by weight per 100 parts of natural or synthetic rubber. When such a tread is compounded with a mercaptosilane in which the mercapto group is reversibly blocked, the tread is said to provide reduced rolling resistance without loss of traction.

U.S. Pat. No. 4,820,751 discloses a rubber composition for tires said to have improved heat build-up and high temperature reinforcibility that comprises specified amounts of particular surface-treated carbon black, silica and particular silane coupling agent based on 100 parts by weight of the rubber ingredient. The preparation of compositions with these silanes, however, is not desirable because the $\alpha$-$\beta$-unsaturated carbonyl group of the thioester has the undesirable potential to polymerize during the compounding process or during storage.

U.S. Pat. No. 5,227,425 discloses a sulfur-vulcanizable rubber composition obtained by thermomechanical working of a conjugated diene compound and an aromatic vinyl compound prepared by solution polymerization in a hydrocarbon solvent having a total content of aromatic vinyl compound of between 5% and 50% and a glass transition temperature (Tg) of between 0° C. and −80° C. with 30 to 150 parts by weight per 100 parts by weight of elastomer of a silica having a BET surface area of between 100 and 250 $m^2/g$, a CTAB surface area of between 100 and 250 $m^2/g$, an oil absorption measured in DBP of between 150 and 250 mL/100 g, and an average projected area of the aggregates greater than 8500 $nm^2$ before use and between 7000 and 8400 $nm^2$ after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes that is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

U.S. Pat. No. 5,650,457 discloses rubber mixtures containing at least one rubber, a vulcanizing agent, a filler, optionally other rubber additives and at least one reinforcing additive of a specified formula, which are used for the production of vulcanized rubbers, from which in particular tires can be produced said to have a low rolling resistance combined with a good wet skid resistance and a high abrasion resistance.

U.S. Pat. No. 5,679,728 discloses a rubber composition containing a cross-linkable rubber component and a carbon black having silica adhered to the surface thereof and a silica surface-treated carbon black suitable for use in tire tread where the surface-treated carbon black has a nitrogen specific surface area of 20 to 300 $m^2/g$, a ratio of the adsorption amount of iodine and the adsorption amount of iodine after treatment by hydrogen fluoride of at least 0.30 but less than 1.0, and a ratio of the adsorption amount of iodine after extraction from a rubber compound and the value of the same after treatment by hydrogen fluoride of at least 0.30 but less than 1.0.

U.S. Pat. No. 6,127,468 discloses the use of blocked mercaptosilanes in filled polymers, wherein the hydrogen atom of the mercaptan functionality has been substituted. The blocked mercaptosilanes described are unique in that they allow the mixing of fillers with organic polymers to proceed with surpressed reactivity toward coupling to the polymer. The coupling reactions of these blocked mercaptosilane compounds are triggered subsequently by addition of an appropriate deblocking agent, which preferably is tetramethylthiuram monosulfide.

JP 63270751 A2 discloses the preparation of rubber compositions for use in tire treads, using silane coupling agents represented by the general formula, $CH_2=C(CH_3)C(=O)S(CH_2)_{1-6}Si(OCH_3)_3$. The preparation of compositions with these silanes, however, is not desirable because the unsaturation adjacent to the carbonyl group of the thioester has the undesirable potential to polymerize during the compounding process or during storage.

AU-A-10082/97 discloses the preparation of rubber compounds using silanes of the structure represented by $R^1{}_nX_{3-n}Si$—$(Alk)_m(Ar)_p$—$S(C=O)$—$R$ (Formula 1) where $R^1$ is phenyl or alkyl; X is halogen, alkoxy, cycloalkoxy, acyloxy, or OH; Alk is alkyl; Ar is aryl; R is alkyl, alkenyl, or aryl; n is 0 to 2; and m and p are each 0 or 1, but not both zero. Compositions of the structure of Formula 1 must be used in conjunction with functionalized siloxanes.

U.S. Pat. No. 3,922,436 discloses carboxylic acid functional silances that are used as coupling agents in glass fiber reinforced elastomers. The silanes are formed by the reaction of an epoxy, a mercapto or an amino silane with a carboxylic acid or anhydride.

Other known means for the preparation of mineral-filled elastomers make use of sulfur-containing silane coupling agents that contain the mercapto (—S—H) or the thiocarbonyl (—C=S) group instead of the more commonly described polysulfide (—S—) group.

Mercaptosilanes have offered superior coupling at substantially reduced loadings. However, their high chemical reactivity with organic polymers leads to unacceptably high viscosities during elevated temperature processing and premature curing (scorch). Their undesirability is aggravated by their odor and perhaps worse, the odor of their impurities. As a result, the polysulfide silane coupling agent and at times, other, less reactive, coupling agents are used in the currently practiced art and donate sulfur during the nonproductive mixes, which causes premature cross-linking and increases in viscosity. The polysulfides do not couple as well as the mercaptosilanes and require much higher loadings. The less reactive coupling agents, such as the thiocarbonyl functional silanes, give inferior performance properties when compared to the mercaptosilanes because the organofunctional group has not bonded completely with the organic rubber during the mixing and curing processes. Therefore, there exists a need for rubber compositions that do not undergo premature scorch at elevated temperature processing and maintain the performance of mercaptosilane-containing rubber compositions.

All references cited herein are incorporated by reference herein in their entirety.

SUMMARY OF THE INVENTION

In a first aspect, the present invention is directed to the preparation and processing of mineral-filled elastomers. In another aspect, the present invention is directed to additives that enhance the performance of latent mercaptosilanes. In still another aspect, the present invention is directed to additives that enhance the performance of the latent mercaptosilanes that are intended to be used with the mineral-filled elastomers.

More particularly, the present invention is directed to a composition of matter comprising:
  A) at least one latent mercaptosilane coupling agent; and
  B) at least one additional mercaptan.

In a preferred embodiment, the present invention is directed to a composition of matter comprising:
  A) at least one sulfur vulcanizable rubber;
  B) at least one latent mercaptosilane coupling agent;
  C) at least one latent-mercaptosilane activator;
  D) at least one filler; and, optionally,
  E) at least one additional mercaptan, (referred to hereinafter as "additional mercaptan").

In another aspect, the present invention is directed to a process for the preparation of a rubber composition consisting essentially of the steps of:
  A) thermomechanically mixing in a first pass:
    1) at least one sulfur vulcanizable rubber;
    2) at least one latent mercaptosilane coupling agent; and
    3) at least one filler; and, optionally,
    4) at least one additional mercaptan;
  B) bringing the temperature of the first pass mix from about 140° C. to about 200° C. over a period of 1 to 20 minutes, preferably 150° C. to 180° C. over a period of about 2 to 10 minutes;
thereby forming a nonproductive first mixture;
  C) thermomechanically mixing the nonproductive first mixture in a second pass, optionally in the presence of at least one curing agent, at a temperature of from about 25 to about 100° C. for a period of from about 1 to about 30 minutes; thereby forming a productive second mixture;
  D) adding at least one latent-mercalptosilane activator in step A), step C), or both step A) and step C);
  E) shaping the second mixture; and then
  F) curing (cross-linking) the second mixture at a temperature between about 130° C. to about 200° C. for a period of from about 5 to about 60 minutes.

Preferably, in the above-described process, at least one latent-mercaptosilane activator is added in step A). Optionally, the filler in step A) can be pretreated with at least a portion of the latent-mercaptosilane coupling agent.

In yet another aspect, the present invention is directed to a tire comprising a cured composition of matter comprising:
  A) at least one sulfur vulcanizable rubber;
  B) at least one latent mercaptosilane coupling agent;
  C) at least one latent-mercaptosilane activator;
  D) at least one filler; and, optionally,
  E) at least one additional mercaptan.

In still another aspect, the present invention is directed to a tire tread comprising a cured composition of matter comprising:
  A) at least one sulfur vulcanizable rubber;
  B) at least one latent mercaptosilane coupling agent;
  C) at least one latent-mercaptosilane activator;
  D) at least one filler; and, optionally,
  E) at least one additional mercaptan.

Where, in the above described aspects of the present invention, at least one additional mercaptan is present, it is preferably a mercaptosilane.

DESCRIPTION OF THE PREFERRED EMBODIMENT(S)

The present invention offers improvements in the preparation of elastomer compositions containing mineral fillers and silane coupling agents. These improvements are made possible by the choice of a coupling agent that extends the rigor with which the rubber can be processed without the detrimental effects that would accompany rubber processed using the silane coupling agents known heretofore. The improvements are also realized by proper modification of rubber compounding procedures and by the addition of promoters, hereinafter referred to as latent-mercaptosilane activators, which are chemical compounds that act in concert with latent mercaptosilanes used in the elastomer compositions of the present invention. These improvements include increased efficiency and the elimination of a mixing step in preparing the rubber compound. Whereas two mixing cycles, commonly called nonproductive mixes, in an internal mixer are typically required with the existing technology, and a third mixing cycle in either an internal mixer or a roll mill to add the curatives, the present invention permits the elimination of one of the mixing cycles. Only a single nonproductive mixing cycle in an internal mixer is required with a second productive mixing cycle in either an internal mixer or a roll mill. In addition to a change in the mix procedure and to accommodate this change, the present invention includes the use of more rigorous mixing conditions, such as higher temperatures, higher mixer-loading levels, and the use of activators at high temperatures prior to the final mixing stage.

The present invention relates to a process for the preparation of elastomer compositions comprising several specific types of ingredients, primarily including organic polymers containing carbon—carbon double bonds and fillers. The fillers are mineral fillers or combinations of mineral and carbon black fillers. Also included among the ingredients are precursor silanes that have the potential to form mercaptosilanes during the process of preparing rubber compositions, but which are not necessarily required to function via the formation of mercaptosilanes. Molecules of these precursor silanes, referred to herein as latent mercaptosilanes, have a blocking group in place of a hydrogen atom. The latent mercaptosilanes have the potential to become de-blocked by replacement of the blocking groups with a hydrogen atom during the rubber compounding and curing procedures to yield a more reactive mercaptosilane, defined herein as a silane whose molecular structure contains at least one mercapto (—SH) group bound to carbon and at least one silicon atom bound to carbon. Further, the ingredients of the elastomer compositions of the present invention may include one or more additional mercaptans, preferably mercaptosilanes. The ingredients also include latent-mercaptosilane activators, defined herein as chemical compositions that function and/or are intended to function in a manner so as to initiate, accelerate, and/or enhance the activity of the latent mercaptosilane in the application described herein. The latent-mercaptosilane activators and the latent mercaptosilane coupling agents junction together to permit the accelerated processing of the elastomer with fewer steps and under conditions more rigorous than those employed heretofore. The ingredients may also include other components known to those skilled in the art.

The latent mercaptosilanes of the present invention comprise at least one compound having the general structure depicted by Formulae 1 and 2:

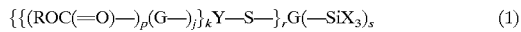  (1)

and

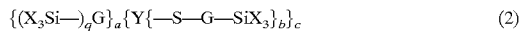  (2)

R is a moiety comprising from 1 to 18 carbon atoms, which, in each occurrence is independently selected from the group consisting of hydrogen; straight, cyclic, or branched alkyl that may or may not contain unsaturation; alkenyl groups; aryl groups; arenyl groups; and aralkyl groups.

Preferably, R is hydrogen, aryl, or $C_1$ to $C_4$ alkyl.

Each occurrence of G is independently a fragment, obtained by substitution of a quantity of hydrogen atoms given by p, of any hydrocarbon or oxa-, aza-, and/or cyano-substituted hydrocarbon, $G_1$, having from 1 to 18 carbon atoms. $G_1$ includes, but is not limited to, 1) branched, straight-chain, cyclic, and/or polycyclic aliphatic hydrocarbons, optionally containing:
  a. ether functionality via oxygen atoms each of which is bound to two separate carbon atoms, or
  b. tertiary amine functionality via nitrogen atoms, each of which is bound to three separate carbon atoms, and/or
  c. cyano (CN) groups;
2) aromatic hydrocarbons; and
3) arenes derived by substitution of the aforementioned aromatics with branched or straight chain alkyl, alkenyl, alkynyl, aryl, and/or aralkyl groups;
with the proviso that if G is univalent (i.e., if p=0), G can be a hydrogen atom.

Each occurrence of X is a moiety independently selected from the group consisting of RO—, RC(=O)O—, $R_2$C=NO—, $R_2$NO—$R_2$N—, —R, and —(OSiR$_2$)$_t$(OSiR$_3$);
wherein each R and G is as described above and at least one X is not —R.

Y is a polyvalent species (Q)$_z$A(=E).

Each occurrence of Q is independently selected from the group consisting of oxygen, sulfur, and (—NR—).

Each occurrence of A is independently selected from the group consisting of carbon, sulfur, phosphorus, and sulfonyl.

Each occurrence of E is independently selected from the group consisting of oxygen, sulfur, and NR.

The following variables are integers, each occurrence of which is independent:
a is 0 to 7;
b is 1 to 3;
c is 1 to 6, preferably 1 to 4;
j is 0 to 1, but is 0 only if p is 1;
k is 1 to 2;
p is 0 to 5;
q is 0 to 6;
r is 1 to 3;
s is 1 to 3;
t is 0 to 5; and
z is 0 to 2;
provided that:
(1) if j is 0, then p is 1;
(2) if A is carbon, sulfur, or sulfonyl, then:
  (i) at least one of a and c is equal to 1;
  (ii) a+b=2; and
  (iii) k=1;
(3) if A is phosphorus, then
  (i) the value of a does not exceed 2c; and
  (ii) k=2.

Preferably, Y is selected from the group consisting of —C(=NR)—; —SC(=NR)—; —SC(=O)—; (—NR)C(=O)—; (—NR)C(=S)—; —OC(=O)—; —OC(=S)—; —C(=O)—; —SC(=S)—; —C(=S)—; —S(=O)—; —S(=O)$_2$—; —OS(=O)$_2$—; (—NR)S(=O)$_2$—; —SS(=O)—; —OS(=O)—; (—NR)S(=O)—; —SS(=O)$_2$—; (—S)$_2$P(=O)—; —(—S)P(=O)—; —P(=O)(-)$_2$; (—S)$_2$P(=S)—; —(—S)P(=S)—; —P(=S)(-)$_2$; (—NR)$_2$P(=O)—; (—NR)(—S)P(=O)—; (—O)(—NR)P(=O)—; (—O)(—S)P(=O)—; (—O)$_2$P(=O)—; —(—O)P(=O)—; —(—NR)P(=O)—; (—NR)$_2$P(=S)—; (—NR)(—S)P(=S)—; (—O)(—NR)P(=S)—; (—O)(—S)P(=S)—; (—O)$_2$P(=S)—; —(—O)P(=S)—; and —(—NR)P(=S)—.

More preferably, Y is selected from the group consisting of —OC(=O)—, —SC(=O)—, —S(=O)—, —OS(=O)—, —(—S)P(=O)—, —C(=O)—, —C(=S)— and —P(—O)(-)₂;

each wherein the atom (A) attached to the unsaturated heteroatom (E) is attached to the sulfur, which in turn is linked via a group G to the silicon atom.

Representative examples of the functional groups (—YS—) present in the latent mercaptosilanes of the present invention include thiocarboxylate ester, —C(=O)—S— (any silane with this functional group is herein referred to as a "thiocarboxylate ester silane"); dithiocarboxylate, —O—C(=S)—S— (any silane with this functional group is herein referred to as a "dithiocarboxylate ester silane"); thiocarbonate ester, —O—C(=O)—S— (any silane with this functional group is herein referred to as a "thiocarbonate ester silane"); dithiocarbonate ester, —S—C(=O)—S— and —O—C(=S)—S— (any silane with this functional group is herein referred to as a "dithiocarbonate ester silane"); trithiocarbonate ester, —SC(=S)S—(any silane with this functional group is herein referred to as a "trithiocarbonate ester silane"); dithiocarbamate ester, —N—C(=S)—S— (any silane with this functional group is herein referred to as a "dithiocarbamate ester silane"); thiosulfonate ester, —S(=O)₂—S— (any silane with this functional group is herein referred to as a "thiosulfonate ester silane"); thiosulfate ester, —O—S(=O)₂—S— (any silane with this functional group is herein referred to as a "thiosulfate ester silane"); thiosulfamate ester, (—N—)S(=O)₂—S— (any silane with this functional group is herein referred to as a "thiosulfamate ester silane"); thiosulfinate ester, C—S(=O)—S— (any silane with this functional group is herein referred to as a "thiosulfinate ester silane"); thiosulfite ester, —0—S(=O)—S— (any silane with this functional group is herein referred to as a "thiosulfite ester silane"); thiosulfimate ester, (—N—)S(=O)—S— (any silane with this functional group is herein referred to as a "thiosulfimate ester silane"); thiophosphate ester, P(=O)(O—)₂(S—) (any silane with this functional group is herein referred to as a "thiophosphate ester silane"); dithiophosphate ester, P(=O)(O—)(S—)₂ and P(=S)(O—)₂(S—) (any silane with this functional group is herein referred to as a "dithiophosphate ester silane"); trithiophosphate ester, P(=O)(S—)₃ and P(=S)(O—)(S—)₂ (any silane with this functional group is herein referred to as a "trithiophosphate ester silane"); tetrathiophosphate ester P(=S)(S—)₃ (any silane with this functional group is herein referred to as a "tetrathiophosphate ester silane"); thiophosphamate ester, —P(=O)(—N—)(S—) (any silane with this functional group is herein referred to as a "thiophosphamate ester silane"); dithiophosphamate ester, —P(=S)(—N—)(S—) (any silane with this functional group is herein referred to as a "dithiophosphamate ester silane"); thiophosphoramidate ester, (—N—)P(=O)(O—)(S—) (any silane with this functional group is herein referred to as a "thiophosphoramidate ester silane"); dithiophosphoramidate ester, (—N—)P(=O)(S—)₂ and (—N—)P(=S)(O—)(S—) (any silane with this functional group is herein referred to as a "dithiophosphoramidate ester silane"); and trithiophosphoramidate ester, (—N—)P(=S)(S—)₂ (any silane with this functional group is herein referred to as a "trithiophosphoramidate ester silane").

A preferred latent mercaptosilane is one wherein Y is —C(=O)— and wherein j is 1, k is 1, p is zero, and G has a primary carbon atom attached to the carbonyl and is a C₂–C₁₂ alkyl, more preferably a C₆–C₈ alkyl. These latent mercaptosilanes can be represented by Formula 3, which is a more specific version of the structure depicted by Formula 1 above:

$$(GYS—)_jG(—SiX_3)_s \qquad (3)$$

Another preferred latent mercaptosilane has a structure of the form X₃SiGSC(=O)GC(=O)SGSiX₃ wherein G is a divalent hydrocarbon.

Representative examples of G include —(CH₂)n— wherein n is 1 to 12, diethylene cyclohexane, 1,2,4-triethylene cyclohexane, and diethylene benzene. It is preferred that the sum of the carbon atoms within the G groups within the molecule is from 3 to 18, more preferably 6 to 14. This amount of carbon in the blocked mercaptosilane facilitates the dispersion of the inorganic filler into the organic polymers, thereby improving the balance of properties in the cured, filled rubber.

Specific examples of X are methoxy, ethoxy, isobutoxy, propoxy, isopropoxy, acetoxy oximato, methyl, and phenyl. Methoxy, acetoxy and ethoxy are preferred. At least one X must be reactive (i.e., hydrolyzable).

Preferably, p is 0 to 2; X is RO— or RC(=O)O—; R is hydrogen, methyl, ethyl, isopropyl, or isobutyl; G is a substituted phenyl or a substituted straight chain C₂ to C₁₂ alkyl. More preferably, p is zero, X is ethoxy, and G is a C₃–C₁₂ alkyl derivative.

The latent mercaptosilanes of the present invention are intended also to include partial hydrolyzates of the compounds having the general structure depcited by Formulae 1 and 2, in that these partial hydrolyzates will be a side product of most methods of manufacture of the latent mercaptosilanes or can occur upon storage of the aforementioned, especially in humid conditions.

As used herein, "alkyl" includes straight, branched, and cyclic alkyl groups; "alkenyl" includes straight, branched, and cyclic alkenyl groups containing one or more carbon—carbon double bonds; and "alkynyl" includes straight, branched, and cyclic alkynyl groups containing one or more carbon—carbon triple bonds and, optionally, one or more carbon—carbon double bonds. Specific alkyls include methyl, ethyl, propyl, and isobutyl. Specific examples of alkenyls include vinyl propenyl, allyl, methallyl, ethylidenyl norbornane, ethylidene norbornyl, ethylidenyl norbornene and ethylidene norbornenyl. Specific examples of alkynyls include acetylenyl, propargyl, and methylacetylenyl. As used herein, "aryl" includes any aromatic hydrocarbon from which one hydrogen atom has been removed; "aralkyl" includes any alkyl groups in which one or more hydrogen atoms have been substituted with aryl substituents; and "arenyl" includes any aryl groups in which one or more hydrogen atoms have been substituted by alkyl substituents. Specific examples of aryls include phenyl and naphthalenyl. Specific examples of aralkyls include benzyl and phenethyl. Specific examples of arenyl include tolyl and xylyl. As used herein, "cyclic alkyl," "cyclic alkenyl," and "cyclic alkynyl" also include bicyclic, tricyclic, and higher cyclic structures, as well as the aforementioned cyclic structures further substituted with alkyl, alkenyl, and/or alkynyl groups. Representive examples include norbornyl, norbornenyl, ethylnorbornyl, ethylnorbornenyl, ethylcyclohexyl, ethylcyclohexenyl, cyclohexylcyclohexyl, and cyclododecatrienyl.

Representative examples of the latent mercaptosilanes useful in the present invention include 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thiioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbomene; 2-(2-triethoxysilyl-1-ethyl)-5-thioacetylnorbornene; 2-(2-triethoxysilyl-1-ethyl)-4-thioacetylnorbornene; 1-(1-oxo-2-thia-5-triethoxysilylpenyl)benzoic acid; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxsilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 1-trimethoxysilyl-1-propyl thiooctoate; 3-triethoxysilyl-1-propyl thiopalmitate; 3-triethoxysilyl-1-propyl thiooctoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldiithiophosphonate; bis-(3-methyldimethoxysilyl-1-propyl)ethyldithiodophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulphate; 3-triethoxysilyl-1-propylmethanethiosulphonate; 3-triethoxysilyl-1-propylethanethiosulphonate; 3-triethoxysilyl-1-propylbenzenethiosulphonate; 3-triethoxysilyl-1-propyltoluenethiosulphonate; 3-triethoxysilyl-1-propylnaphthalenethiosulphonate; 3-triethoxysilyl-1-propylxylenethiosulphonate; triethoxysilylmethylmethylthiosulphate; triethoxysilylmethylmethanethiosulphonate; triethoxysilylmethylethanethiosulphonate; triethoxysilylmethylbenzenethiosulphonate; triethoxysilylmethyltoluenethiosulphonate; triethoxysilylmethylnaphthalenethiosulphonate; and triethoxysilylmethylxylenethiosulphonate.

Where an additional mercaptan is employed in the practice of the present invention, it preferably comprises at least one compound having the general structure depicted by Formula 4:

$$(HS—)_rG(—SiX_3)_t \qquad (4)$$

wherein G, X, r, and t are as defined above. When t is 1 to 5, the compounds are mercaptosilanes, which are preferred.

Representative examples of useful additional mercaptans include those wherein G and X are the same as those included in the above description of the latent mercaptosilanes. Thus, representative examples of G include —(CH$_2$)$_n$— wherein n is 1 to 12; diethylene cyclohexane; 1,2,4-triethylene cyclohexane; and diethylene benzene. G is preferably —CH$_2$—, —(CH$_2$)$_2$—, or —(CH$_2$)$_3$—; more preferably, —(CH$_2$)$_3$—.

Specific examples of X in the additional mercaptans useful herein are methoxy, ethoxy, isobutoxy, propoxy, isopropoxy, acetoxy oximato, methyl, and phenyl. Methoxy, acetoxy, and ethoxy are preferred. At least one X must be reactive (i.e., hydrolyzable). In a highly preferred embodiment, three ethoxy groups are present.

Representative examples of the additional mercaptans useful in the present invention, when they are the preferred mercaptosilanes, include 3-mercapto-1-propyltriethoxysilane, 2-mercapto-1-ethyltriethoxysilane, mercaptomethyltriethoxysilane, 8-mercapto-1-octyltriethoxysilane, 10-mercapto-1-decyltriethoxysilane, 1-mercapto-1-ethyltriethoxysilane, 3-mercapto-1-propylmethyldiethoxysilane, 3-mercapto-1-propyldimethylethoxysilane, 3-mercapto-1-propyltrimethoxysilane, 2-mercapto-1-ethyltrimethoxysilane, mercaptomethyltrimethoxysilane, 8-mercapto-1-octyltrimethoxysilane, 10-mercapto-1-decyltrimethoxysilane, 1-mercapto-1 ethyltrimethoxysilane, 3-mercapto-1-propylmethyldimethoxysilane, 3-mercapto-1-propyldimethylmethoxysilane, 3-mercapto-1-propyltripropoxysilane, 3-mercapto-1-propyltriisopropoxysilane, and 3-mercapto-1-propyltributoxysilane.

Mixtures of various additional mercaptans and/or latent mercaptosilanes may be used, for example, where synthetic methods result in a distribution of various silanes or where mixtures of mercaptans and/or latent mercaptosilanes are used for their various blocking or leaving functionalities. Moreover, it should be understood that the partial hydrolyzates of these additional mercaptans and/or latent mercaptosilanes (i.e., mercaptosiloxanes and/or latent mercaptosiloxanes) may also be encompassed by the additional mercaptans and latent mercaptosilanes of the present invention, in that these partial hydrolyzates will be a side product of most methods of manufacture of these mercaptans and latent mercaptosilanes, or may be generated during their storage, especially under humid conditions.

Where an additional mercaptan is employed in the practice of the present invention, the mixtures can contain from about 50 to about 99.9 weight percent of at least one latent mercaptosilane and from about 0.1 to about 50 weight percent the additional mercaptan, preferably from about 80 to 99 weight percent latent mercaptosilane and from about 1 to 20 weight percent additional mercaptan, and, more preferably, from about 90 to about 98 weight percent latent mercaptosilane and from about 2 to about 10 weight percent additional mercaptan.

The latent mercaptosilane, if liquid, may be loaded on a carrier, such as a porous polymer, carbon black or mineral filler so that it is in solid form for delivery to the rubber. In a preferred mode, the carrier would be part of the filler to be used in the rubber.

The latent-mercaptosilane activators of the present invention comprise at least one compound having the general structure depicted by Formulae 5, 6, and 7:

 (5)

 (6)

 (7)

wherein:
  each Z is independently selected from the group consisting of an oxygen atom and NR, wherein R is as defined above;
  each R is defined as above;
  each U is independently a fragment, obtained by substitution of a quantity of hydrogen atoms given by 2q+2, of any hydrocarbon or oxa-, aza-, and/or cyano-substituted hydrocarbon, $U_1$, having from 1 to 30 carbon atoms. $U_1$ includes, but is not limited to, branched, straight-chain, cyclic, and/or polycyclic aliphatic hydrocarbons, optionally containing ether functionality via oxygen atoms, each of which is bound to two separate carbon atoms; tertiary amine functionality via nitrogen atoms, each of which is bound to three separate carbon atoms, and/or cyano (CN) groups; aromatic hydrocarbons; and arenes derived by substitution of the aforementioned aromatics with branched or straight chain alkyl, alkenyl, alkynyl, aryl, and/or aralkyl groups;
  each L is independently a fragment, obtained by substitution of a quantity of hydrogen atoms given by c, of ammonia and any hydrocarbon or oxa-, aza-, and/or cyano-substituted hydrocarbon, $L_1$, having from 1 to 30 carbon atoms. $L_1$ includes, but is not limited to, branched, straight-chain, cyclic, and/or polycyclic aliphatic hydrocarbons, optionally containing ether functionality via oxygen atoms, each of which is bound to two separate carbon atoms; tertiary amine functionality via nitrogen atoms, each of which is bound to three separate carbon atoms, and/or cyano (CN) groups; aromatic hydrocarbons; and arenes derived by substitution of the aforementioned aromatics with branched or straight chain alkyl, alkenyl, alkynyl, aryl and/or aralkyl groups;
  m is an integer of from 0 to 500; g is 0 to 1; d is 0 to 2, with the proviso that d is not 2 if Z is oxygen; and c and q are defined as above.

Representative examples of R in the latent-mercaptosilane activators (structures given by Formulae 5, 6, and 7) include phenyl, as for example in any of the isomers of diphenylguanidine (Formula 6); benzyl; cyclohexyl; methyl; ethyl; propyl; iso-propyl; butyl; sec-butyl; tert-butyl; and neopentyl.

Representative examples of U in these same structures include carbon, as, for example, in any of the isomers of diphenylguanidine (Formula 6); —$CH_2$—, as, for example, in glycerol (Formula 7); —$CH_2CH_2$—, as, for example, in the cyclic (Formula 5) or linear (Formula 6) ethyleneamines, as in the polyethylene or mixed polyethylene-polypropylene glycols (Formula 6), and as in ethanolamine or diethanolamine (Formula 6); and —$CH_2CH(CH_3)$—, as, for example, in the polypropylene or —$CH_2CH_2$— and —$CH_2CH(CH_3)$—, as, for example, mixed polyethylene-polypropylene glycols (Formula 6).

Representative examples of L in these structures (Formula 7) include $CH_3C(-)_3$, as, for example, in trimethylolethane; $C_2H_5C(-)_3$, as, for example, in trimethylolpropane; $CH(-)_3$, as, for example, in glycerol; and $N(-)_3$, as, for example, in triethanolamine.

Representative examples of latent-mercaptosilane activators useful in the present invention include N,N'-diphenylguanidine (DPG) and any of its isomers; the ethanolamines, ethanolamine, diethanolamine, and triethanolamine; the ethyleneamines, such as ethylene diamine, diethylene triamine, triethylene tetramine, tetraethylene pentamine, etc.; ethylene glycol and the polyethylene glycols, such as diethylene glycol, triethylene glycol, tetraethylene glycol, etc.; propylene glycol and the polypropylene glycols, such as dipropylene glycol, tripropylene glycol, tetrapropylene glycol, etc.; any of the mixed ethylene-propylene glycols; any of the aforementioned glycols terminated on one end by an alkyl group, such as 2-methoxyethanol, 2-ethoxyethanol, 2-butoxyethanol, 1-methoxyisopropanol, 1-ethoxyisopropanol, and 1-butoxyisopropanol, 2-(2-methoxyethoxy)ethanol, 2-(2-ethoxyethoxy)ethanol, 2-(2-butoxyethoxy)ethanol, and 2-(2-hexoxyethoxy)ethanol; glycerol; any of the trimethylolalkanes, such as trimethylolethane and trimethylolpropane; pentaerythritol; any of the anilines and phenylene diamines; phenol; catechol; dihydroquinone; resorcinol; any of the aminophenols; 1,3-diaminopropane; 1,4-diaminobutane; 1,5-diaminopentane; 1,6-diaminohexane; N-(3-aminopropyl)-1,3-propanediamine (3,3'-iminobispropylamine); 3-amino-1-propanol; imidazole; benzimidazole; any of the isomers of aminobenzimidazole; pyrrole; indole; pyrazole; triazole; and benzotriazole.

In a preferred embodiment of the present invention, latent-mercaptosilane activators are used that have, as a minimum, a sufficiently low volatility that losses due to evaporation are minimized at the temperatures used during processing of the rubber, which can be up to about 200° C. Preferred latent-mercaptosilane activators are also capable of functioning efficiently as a proton source and blocking group acceptor so that they can de-block and thereby activate the latent mercaptosilane by the in situ formation of a mercaptosilane from the latent mercaptosilane.

Highly preferred embodiments of the present invention include the use of latent-mercaptosilane activators selected from the group consisting of N,N'-diphenylguanidine (DPG); glycerol; N-(3-aminopropyl)-1,3-propanediamine (3,3'-iminobispropylamine); diethylene triamine; triethylene tetramine; trimethylolpropane; and ethylene glycol. The most preferred latent-mercaptosilane activators are DPG, glycerol, diethylene glycol, and trimethylol propane.

The elastomers useful with the coupling agents described herein include sulfur vulcanizable rubbers including conjugated diene homopolymers and copolymers, and copolymers of at least one conjugated diene and at least one aromatic vinyl compound. Suitable organic polymers for the preparation of rubber compositions are well known in the art and are described in various textbooks, including *The Vanderbilt Rubber Handbook,* Ohm, R. F., R. T. Vanderbilt Company, Inc., 1990, and the *Manual for the Rubber Industry,* Kemperman, T. and Koch, S. Jr., Bayer A G, Leverkusen, 1993.

One example of a suitable polymer for use herein is solution-prepared styrene-butadiene rubber (sSBR). This polymer typically has a bound styrene content in the range of from 5 to 50, preferably from 9 to 36 weight percent and a vinyl content from 10 to 60 weight percent, and preferably 20 to 55 weight percent. Other useful polymers include styrene-butadiene rubber (SBR), natural rubber (NR), ethylene-propylene copolymers and terpolymers (EP, EPDM), acrylonitrile-butadiene rubber (NBR), polybutadiene (BR), and the like.

The rubber composition comprises at least one diene-based elastomer, or rubber. Suitable conjugated dienes are isoprene and 1,3-butadiene and suitable vinyl aromatic compounds are styrene and alpha methyl styrene. Polybutadiene can be characterized as existing primarily (typically about 90% by weight) in the cis-1,4-butadiene form.

Thus, the rubber is a sulfur curable rubber. Such diene based elastomer, or rubber, may be selected, for example, from at least one of cis-1,4-polyisoprene rubber (natural and/or synthetic), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35–50 percent vinyl), high vinyl polybutadiene rubber (50 to 75 percent vinyl), styrene/isoprene copolymers, emulsion polymerization prepared styrene/butadiene/acrylonitrile terpolymer rubber and butadiene/acrylonitrile copolymer rubber.

For some applications, an emulsion polymerization derived styrene/butadiene (E-SBR) having a relatively conventional styrene content of about 20 to 28 percent bound styrene, or an E-SBR having a medium to relatively high bound styrene content of about 30 to 45 percent may be used.

Emulsion polymerization prepared styrene/butadiene/acrylonitrile terpolymer rubbers containing 2 to 40 weight percent bound acrylonitrile in the terpolymer are also contemplated as diene based rubbers for use in this invention.

A particulate filler is also added to the crosslinkable elastomer compositions of the present invention, including siliceous fillers, other mineral fillers, carbon black, and the like. The filler materials useful herein include, but are not limited to, metal oxides, such as silica (pyrogenic and precipitated), titanium dioxide, aluminosilicate and alumina, clays and talc, silica modified carbon black, carbon black, and the like.

Particulate, precipitated silica is also sometimes used for such purpose, particularly when the silica is used in conjunction with a silane. In some cases, a combination of silica and carbon black is utilized for reinforcing fillers for various rubber products, including treads for tires. Alumina can be used either alone or in combination with silica. The term, alumina, can be described herein as aluminum oxide, or $Al_2O_3$. The fillers may be hydrated or in anhydrous form. Use of alumina in rubber compositions is described, for example, in U.S. Pat. No. 5,116,886 and EP 631 982.

The latent mercaptosilane(s) can be premixed or pre-reacted with the filler particles, or can be added to the rubber mix during the rubber and filler processing, or mixing stages. If the latent mercaptosilanes and filler are added separately to the rubber mix during the rubber and filler mixing, or processing stage, it is considered that the latent mercaptosilane(s) then combine(s) in an in situ fashion with the filler.

The vulcanized rubber composition should contain a sufficient amount of filler to contribute a reasonably high modulus and high resistance to tear. The combined weight of the filler may be as low as about 5 to about 100 phr but is more preferably from about 25 to about 85 phr.

Preferably, at least one precipitated silica is utilized as a filler. The silica may be characterized by having a BET surface area, as measured using nitrogen gas, preferably in the range of about 40 to about 600 $m^2/g$, more preferably in the range of from about 50 to about 300 $m^2/g$. The BET method of measuring surface area is described in the *Journal of the American Chemical Society*, 60:304 (1930). The silica typically has a dibutylphthalate (DBP) absorption value in a range of 100 to 350 ml/100 grams, more usually, 150 to 300 ml/100 grams. Further, the silica, as well as the alumina and aluminosilicate mentioned above, may be expected to have a CTAB surface area in a range of 100 to 220 $m^2/g$. The CTAB surface area is the external surface area as evaluated by cetyl trimethylammonium bromide with a pH of 9. The method is described in ASTM D 3849.

The average mercury porosity specific surface area for the silica should be in a range of from about 100 to about 300 $m^2/g$. Mercury porosity surface area is the specific surface area determined by mercury porosimetry. Using this method, mercury is penetrated into the pores of the sample after a thermal treatment to remove volatiles. Set up conditions may be suitably described as using a 100 mg sample; removing volatiles over a period of two hours at 105° C. and ambient atmospheric pressure; ambient to 2000 bars pressure measuring range. Such an evaluation may be performed according to the method described in Winslow, Shapiro in ASTM bulletin, page 39 (1959) or according to DIN 66133. For such an evaluation, a CARLO-ERBA Porosimeter 2000 might be used.

A suitable pore size distribution for the silica, alumina and aluminosilicate according to such mercury porosity evaluation is considered herein to be such that five is percent or less of its pores have a diameter of less than about 10 nm, 60 to 90 percent of its pores have a diameter of 10 to 100 nm, 10 to 30 percent of its pores have a diameter at 100 to 1,000 nm, and 5 to 20 percent of its pores have a diameter of greater than about 1,000 nm.

The silica typically has an average ultimate particle size in the range of, for example, 10 to 50 nm as determined by the electron microscope, although the silica particles may be even smaller or, possibly, larger in size. Various commercially available silicas may be considered for use in this invention, such as HI-SIL 210, 243, etc. (PPG Industries); ZEOSIL 1165MP (Rhodia); ULTRASIL VN2, VN3, and 7000GR, etc. (Degussa); and ZEOPOL 8745 and 8715 (Huber).

In compositions for which it is desirable to utilize siliceous fillers, such as silica, alumina, and/or aluminosilicates in combination with carbon black reinforcing pigments, the compositions may comprise a filler mix of from about 15 to about 95 weight percent of the siliceous filler, and from about 5 to about 85 weight percent carbon black, wherein the carbon black has a CTAB value in a range of 80 to 150 $m^2/g$. More typically, it is desirable to use a weight ratio of siliceous fillers to carbon black of at least about 1/1, and preferably at least about 3/1. The siliceous filler and carbon black may be pre-blended or added separately during mixing of the vulcanizable rubber.

In preparing the rubber compositions of the present invention, at least one of the latent mercaptosilanes is mixed with the organic polymer before, during, or after the compounding of the filler into the organic polymer. Addition of the latent mercaptosilanes during the compounding of the filler into the organic polymer is preferred, because these silanes facilitate and improve the dispersion of the filler. The total amount of latent mercaptosilane present in the resulting combination should be about 0.05 to about 25 parts by weight per hundred parts by weight of filler; more preferably 1 to 10 parts.

In practice, sulfur vulcanized rubber products are typically prepared by thermomechanically mixing rubber and various ingredients in a sequential, step-wise, manner, followed by shaping and heating the compounded rubber to form a vulcanized (cured) product.

First, for the mixing of the rubber and various ingredients, usually exclusive of sulfur and sulfur vulcanization accelerators (collectively, curing agents), the rubber(s) and various rubber compounding ingredients typically are blended in at least one, and often (in the case of silica filled low rolling resistance tires) two or more, preparatory thermomechanical mixing stage(s) in suitable mixers. Such preparatory mixing is referred to as non-productive mixing or nonproductive mixing steps or stages. Such preparatory mixing usually is conducted at temperatures of about 140° C. to 200° C., usually about 150° C. to 180° C., in the mixer.

Subsequent to such preparatory mix stages, in a final mixing stage, sometimes referred to as a productive mix stage, curing agents, and possibly one or more additional ingredients, are mixed with the rubber compound or composition, at lower temperatures of typically about 50° C. to about 110° C. in order to prevent or retard premature curing of the sulfur curable rubber, sometimes referred to as scorching. The rubber mixture, also referred to as a rubber compound or composition, typically is allowed to cool, for example, to a temperature of about 50° C. or lower, sometimes after or during a process intermediate mill mixing, between the various mixing steps. When it is desired to mold and to cure the rubber, it is formed into an appropriate shape and brought to a temperature of at least about 130° C., and up to about 200° C., which will cause the vulcanization of the rubber by the mercapto groups on the mercaptosilane and the other sulfur sources in the rubber mixture.

Thermomechanical mixing refers to the phenomenon whereby, owing to the shear forces and associated friction occurring as a result of mixing the rubber compound, or some blend of the rubber compound itself and rubber compounding ingredients, in a high shear mixer, the temperature autogeneously increases, i.e., it "heats up."

Several chemical reactions may occur at various steps in the mixing and curing processes.

The first reaction is a relatively fast reaction and is considered herein to take place between the filler and the —SiX$_3$ group of the latent mercaptosilane. Such a reaction may occur at a relatively low temperature, such as, for example, about 120° C. The second reaction is considered herein to be the reaction that takes place between the sulfur-containing portion of the latent mercaptosilane and the sulfur vulcanizable rubber at a higher temperature, for example, above about 140° C.

Another sulfur source may be used, for example, in the form of elemental sulfur, such as, but not limited to, S$_8$. A sulfur donor is considered herein as a sulfur-containing compound that liberates free, or elemental, sulfur at a temperature in a range of from about 140° C. to about 190° C. Such sulfur donors include, but are not limited to, polysulfide vulcanization accelerators and organosilane polysulfides with at least three connecting sulfur atoms in the polysulfide bridge. The amount of free sulfur source addition to the mixture can be controlled or manipulated as a matter of choice relatively independent of the addition of the latent mercaptosilane. Thus, for example, the independent addition of a sulfur source may be manipulated by the amount of addition thereof and by the sequence of addition relative to the addition of other ingredients to the rubber mixture.

A desirable rubber composition may therefore comprise:
(1) about 100 parts by weight of at least one sulfur vulcanizable rubber selected from the group consisting of conjugated diene homopolymers and copolymers and copolymers of at least one conjugated diene and at least one aromatic vinyl compound,
(2) about 5 to 100 parts, preferably about 25 to 80 parts, per 100 parts by weight rubber of at least one particulate filler,
(3) up to about 5 parts by weight per 100 parts by weight rubber of a curing agent,
(4) from 0.5 to 10 parts by weight per 100 parts by weight rubber of a latent-mercaptosilane activator,
(5) up to about 10 parts by weight per 100 parts by weight rubber of an additional mercaptan, and
(6) about 0.05 to about 25 parts per hundred parts by weight rubber of at least one latent mercaptosilane, all as described herein.

The filler preferably is from 15 to 100 weight percent siliceous filler, such as silica and from about 0 to about 85 weight percent carbon black based on the total weight of the filler.

The rubber composition is preferably prepared by first blending:
(1) rubber, filler, latent mercaptosilane activator, and latent mercaptosilane, or (Alternative 1) rubber, filler pretreated with all or a portion of the latent mercaptosilane, any remaining latent mercaptosilane, latent mercaptosilane activator, and
(2) any other optional ingredients necessary to provide a useful compound in a thermomechanical mixing step; and then bringing the temperature to about 140–200° C. over a period of about 1 to 20 minutes, preferably about 150–180° C. over a period of about 10 to 24 minutes.

The rubber composition can, alternatively, be prepared by adding the latent mercaptosilane activator to the productive mix, rather than during the nonproductive mix.

Where a curing agent is employed, it is added in another thermomechanical productive mixing step at a temperature of from about 25° C. to about 110° C., more preferably from about 50° C. to about 110° C., and mixed for about 1 to 30 minutes. After shaping, the temperature is raised again to between about 130° C. and about 200° C. and curing is accomplished in about 5 to about 60 minutes.

The process may also comprise the additional steps of preparing an assembly of a tire or sulfur vulcanizable rubber with a tread comprised of the rubber composition prepared according to the present invention and vulcanizing the assembly at a temperature in a range of from about 130° C. to about 200° C.

Optional ingredients that may be added to the rubber compositions of the present invention include curing aids, i.e. sulfur compounds, including activators, retarders and accelerators, processing additives, such as oils, plasticizers, tackifying resins, silicas, other fillers, pigments, fatty acids, zinc oxide, waxes, antioxidants and antiozonants, peptizing agents, reinforcing materials such as, for example, carbon black, and the like. Any such additives are selected based upon the intended use and on the sulfur vulcanizable material selected for use, which selections are within the knowledge of those skilled in the art, as are the required amounts of such additives.

The vulcanization may be conducted in the presence of additional sulfur vulcanizing agents. Examples of suitable sulfur vulcanizing agents include, for example, elemental sulfur (free sulfur) or sulfur donating vulcanizing agents, for example, an amino disulfide, polymeric polysulfide or sulfur olefin adducts that are conventionally added in the final, productive, rubber composition mixing step. The sulfur vulcanizing agents (which are common in the art) are used, or added in the productive mixing stage, in an amount ranging from about 0.4 to about 3 phr, or even, in some circumstances, up to about 8 phr, with a range of from about 1.5 to about 2.5 phr being preferred.

Optionally, vulcanization accelerators may be used herein. It is appreciated that they may be, for example, of the type such as, for example, benzothiazole, alkyl thiuram disulfide, guanidine derivatives, and thiocarbamates. Examples of such accelerators include, but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methyl piperazine), dithiobis(N-beta-hydroxy ethyl piperazine) and dithiobis (dibenzyl amine).

Additionally, sulfur donors may be used, for example, thiuram and morpholine derivatives. Examples of such donors include, but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, and disulfidecaprolactam.

Accelerators are used to control the time and/or temperature required for vulcanization and to improve the properties of the vulcanizate. In one embodiment, a single accelerator system may be used, i.e., a primary accelerator. Conventionally and preferably, at least one primary accelerator is used in a total amount ranging from about 0.5 to about 4, preferably about 0.8 to about 1.5 phr. Combinations of a primary and a secondary accelerator may be used, with the secondary accelerator being used in smaller amounts (about 0.05 to about 3 phr) in order to activate and improve the properties of the vulcanizate. Suitable types of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate, or thiuram compound. Delayed action accelerators may be used. Vulcanization retarders might also be used.

Tackifier resins, if used, are typically employed at a level of from about 0.5 to about 10 phr, usually about 1 to about 5 phr. Typical amounts of processing aids are from about 1 to about 50 phr. Such processing aids can include, for example, aromatic, naphthenic, and/or paraffinic processing oils. Typical amounts of antioxidants are from about 1 to about 5 phr. Representative antioxidants include diphenyl-p-phenylenediamine and others, such as, for example, those disclosed in the *Vanderbilt Rubber Handbook* (1978), pages 344 to 346. Typical amounts of antiozonants are from about 1 to about 5 phr. Typical amounts of fatty acids (which can include stearic acid), if used, are from about 0.5 to about 3 phr. Typical amounts of zinc oxide are about 2 to about 5 phr. Typical amounts of waxes are from about 1 to about 5 phr. Often microcrystalline waxes are used. Typical amounts of peptizers are from about 0.1 to about 1 phr. Typical peptizers may be, for example, pentachlorothiophenol and dibenzamidodiphenyl disulfide.

The rubber composition of this invention can be used for various purposes. For example, it can be used for various tire compounds. Such tires can be built, shaped, molded and cured by various methods which are known and will be readily apparent to those having skill in such art.

In the practice of the present invention, the use of the latent-mercaptosilane activators and/or the mercaptosilanes leads to improvements in the utilization of the latent mercaptosilanes as coupling agents for mineral-filled elastomers. The combination of (1) the use of higher mixing temperatures than those typically used in the art, (2) the introduction of activators, such as N,N'-diphenylguanidine (DPG), during the non-productive mixing stage, (3) the use of the latent mercaptosilanes as coupling agents, and (4) optionally, the use of smaller amounts of mercaptans, preferably mercaptosilanes permits the elimination of an entire processing step in the processing of mineral-filled elastomers. This elimination of a processing step is highly advantageous in that it leads to substantial cost reductions in the compounding of mineral-filled elastomers. The use of the latent mercaptosilane leads to significant reductions in compound viscosity compared to the viscosities obtained by current technology. It also permits the use of higher mixer fill factors, resulting in substantial gains in production throughput with existing capacity. Adjustments in the way the filler is added during mixing results in better filler dispersion, compound hysteresis, and reinforcement properties.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

There are at least two basic mix procedures commonly reported for compounding silica filled rubber used in tires. The current technology uses what is referred to a "2 pass mix" for the "nonproductive" mix stage in a large internal mixer, such as F80 liter, F370 liter, and F620 liter Banbury® internal mixers:

Typically, First Pass in a Banbury F80 mixer:
1. Add SSBR and BR, ram down mix (RDM) 30 seconds at 41 RPM.
2. Add one half of the total quantity of silica, all silane, RDM 30 seconds.
3. Add one half of the otal quantity of silica, all oil, RDM 30 seconds.
4. Brush (sweep), RDM 20 seconds.
5. Brush, increase RPM to 71, RDM to 160° C.
6. Dump, sheet off 1525 mm. roll mill. Cool to room temperature.

Typically, Second Pass:
1. Add compound from first pass. RDM 30 seconds at 41 RPM.
2. Add ZnO, stearic acid, wax, 6 PPD, carbon black, RDM 30 seconds.
3. Brush. RPM to 71, RDM to 160° C.
4. Hold at 155° C. to 160° C. for eight minutes by adjusting RPM as needed.
5. Dump. Sheet off 1525 mm. roll mill. Cool to room temperature.

By employing the silanes of the present invention, this process can be reduced to a "one pass mix" in a Banbury F80 internal mixer as follows:
1. Add SSBR and BR, ram down mix (RDM) 30 seconds at 41 RPM.

2. Add one half of the total quantity of silica, all silane, RDM 30 seconds.

3. Add one half of the total quantity of silica, all oil, RDM 30 seconds.

4. Brush (sweep), RDM 20 seconds.

5. Brush, RDM 20 seconds.

6. Add ZnO, stearic acid, wax, 6PPD, carbon black, RDM 30 seconds.

7. Brush. RPM to 71, RDM to 170° C.

8. Hold at 165° C. to 175° C. for eight minutes by adjusting RPM as needed.

9. Dump. Sheet off 1525 mm. roll mill. Cool to room temperature.

Both procedures produce what are referred to as nonproductive compounds. Both then require an additional pass to make a finished (productive) compound. The additional pass is usually done in an internal mixer on a commercial scale, but can be done on a roll mill to avoid cross-contamination problems.

Additional Pass (Productive Mix):

1. Band compound from end of first or second pass roll mill, roll temperatures 50–60° C.

2. Add sulfur and accelerators.

3. Mix by cutting six times on each side, folding the sides into the center of the mill. Allow a rolling nip to form between cuts, typically 15 to 30 seconds mixing time between cuts.

4. Sheet off mill and cool to room temperature.

Processability tests are then performed, and test samples are prepared. Appropriate procedures are as follows:

| | |
|---|---|
| Mooney viscosity and scorch | ASTM D1646 |
| Oscillating disc rheometer | ASTM D2084 |
| Curing of test plaques | ASTM D3182 |
| Stress-strain properties | ASTM D412 |
| Abrasion | DIN 53 516 |
| Heat build-up | ASTM D623 |

The formulation, mix procedures, and examples below all apply to experiments in an F80 (80 liter) Farrell "Banbury" mixer.

BASIC FORMULATION

| PARTS | INGREDIENT | PRODUCT NAME | SUPPLIER |
|---|---|---|---|
| 75 | Solution SBR | SOLFLEX 1216 | Goodyear |
| 25 | Polybutadiene | BUDENE 1207 | Goodyear |
| 80 | Silica | ZEOSIL 1165MP | Rhodia |
| 32.5 | Processing Oil | SUNDEX 8125 | Sun Oil |
| 2.5 | Zinc Oxide | KADOX 720C | Zinc Corp. |
| 1.0 | Stearic Acid | F-300 | Harwick |
| 2.0 | 6PPD Antioxidant | FLEXZONE 7P | Uniroyal Chemical |
| 1.5 | Microwax | SUNPROOF IMPROVED | Uniroyal Chemical |
| 3.0 | Carbon Black | N-330 | Engineered Carbons |
| 1.4 | Sulfur | Rubbermakers 104 | Harwick |
| 1.7 | CBS | DELAC-5 | Uniroyal Chemical |
| 2.0 | DPG | DPG | Uniroyal Chemical |
| Variable | Silane | Various | OSi Specialties |

SILANES USED
Designation    Chemical name
Silquest ® A-1289    bis(3-triethoxysilyl-1-propyl) tetrasulfide

-continued
BASIC FORMULATION

| PARTS | INGREDIENT | PRODUCT NAME | SUPPLIER |
|---|---|---|---|
| | Silquest A-1589 | bis(3-triethoxysilyl-1-propyl) disulfide | |
| | Silquest A-1891 | 3-mercaptopropyltriethoxysilane | |
| | Silane A | 3-octanoylthio-1-propyltriethoxysilane | |
| | Silane B | 3-acetylthio-1-propyltriethoxysilane | |
| | Silane C | 3-mercapto-1-propyltrimethoxysilane | |

Mix Procedures Used

All mixed in an F80 Banbury internal mixer equipped with ST rotors, manufactured by Farrel Corporation.

For Compound 1A & 1B 7.0 phr A-1289 (2 pass), 67% fill factor.

$1^{st}$ pass Temperature of sides and rotors set at 13° C., door at 27° C.

1. Add SSBR and BR, ram down mix (RDM) 30 seconds at 41 RPM.

2. Add one-half of the total quantity of silica, all silane, RDM 30 seconds.

3. Add one-half of the total quantity of silica, all oil, RDM 30 seconds.

4. Brush (sweep), RDM 20 seconds.

5. Brush, increase RPM to 71, RDM to 166° C.

6. Dump, sheet off 1525 mm. roll mill. Cool to room temperature.

$2^{nd}$ pass Temperature of sides, rotors, and doors set at 5° C.

1. Add compound from $1^{st}$ pass. RDM 30 seconds at 41 RPM.

2. Add ZnO, stearic acid, wax, 6PPD, carbon black, RDM 30 seconds.

3. Brush. RPM to 71, RDM to 160° C.

4. Hold at 160° C. for 8 minutes by adjusting RPM to 26.

5. Dump. Sheet off 1525 mm. roll mill. Cool to room temperature.

For Compound 2A & 2B 6.2 phr A-1589 (2 pass), 67% fill factor.

$2^{nd}$ pass Temperature of sides, rotors, and doors set at 5° C.

1. Add compound from $1^{st}$ pass. RDM 30 seconds at 41 RPM.

2. Add ZnO, stearic acid, wax, 6PPD, carbon black, RDM 30 seconds.

3. Brush. RPM to 72, RDM to 165° C.

4. Hold at 165° C. for eight minutes by adjusting RPM to 26.

5. Dump. Sheet off 1525 mm. roll mill. Cool to room temperature.

For Compound 3A & 3B 9.7 phr Silane A (2 pass), 67% fill factor.

1. Add compound from $1^{st}$ pass. RDM 30 seconds at 41 RPM.

2. Add ZnO, stearic acid, wax, 6PPD, carbon black, RDM 30 seconds.

3. Brush. RPM to 71, RDM to 170° C.

4. Hold at 170° C. for eight minutes by adjusting RPM to 30.

5. Dump. Sheet off 1525 mm. roll mill. Cool to room temperature.

For Compound 4AB 9.7 phr Silane A (1 pass), 67% fill factor.
  Temperature of sides, rotors, door set at 5° C.
  1. Add SSBR and BR, ram down mix (RDM) 30 seconds at 41 RPM.
  2. Add one-half of the total quantity of silica, all silane, RDM 30 seconds.
  3. Add one-half of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 175° C.
  8. Hold at 175° C. for 8 minutes by adjusting RPM to 32.
  9. Dump. Sheet off 1525 mm. roll mill. Cool to room temperature.

For Compound 5AB 9.7 phr Silane A (1 pass), 67% fill factor.
  Temperature of sides, rotors, door set at 5° C.
  1. Add SSBR and BR, ram down mix (RDM) 30 seconds at 41 RPM.
  2. Add one-half of the total quantity of silica, all silane, RDM 30 seconds.
  3. Add one-half of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 170° C.
  8. Hold at 170° C. for 8 minutes by adjusting RPM to 38.
  9. Dump. Sheet off 1525 mm. roll mill. Cool to room temperature.

For Compound 6AB 9.7 phr Silane A (1 pass), 67% fill factor.
  Temperature of sides, rotors, door set at 5° C.
  1. Add SSBR and BR, ram down mix (RDM) 30 seconds at 40 RPM.
  2. Add one-half of the total quantity of silica, all silane, RDM 30 seconds.
  3. Add one-half of the total quantity of silica, all oil, RDM 30 seconds.
  4. Brush (sweep), RDM 20 seconds.
  5. Brush. RDM 20 seconds.
  6. Add ZnO, stearic acid, wax, 6PPD, carbon black, RDM 30 seconds.
  7. Brush. RPM to 71, RDM to 160° C.
  8. Hold at 160° C. for eight minutes by adjusting RPM to 46.
  9. Dump. Sheet off 1525 mm. roll mill. Cool to room temperature.

For Compound 9AB 9.7 phr Silane A (1 pass), 67% fill factor.
  Temperature of sides, rotors, door set at 5° C.
  1. Add SSBR and BR, ram down mix (RDM) 30 seconds at 40 RPM.
  2. Add three-quarters of the total quantity of silica, all silane, RDM 30 seconds.
  3. Add one-quarter of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 160° C.
  8. Hold at 160° C. for eight minutes by adjusting RPM to 34.
  9. Dump. Sheet off 1525 mm. roll mill. Cool to room temperature.

For Compound 10AB 9.7 phr Silane A (1 pass), 67% fill factor.
  Temperature of sides, rotors, door set at 5° C.
  1. Add SSBR and BR, ram down mix (RDM) 30 seconds at 40 RPM.
  2. Add nine-tenths of the total quantity of silica, all silane, RDM 30 seconds.
  3. Add one-tenth of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 160° C.
  8. Hold at 160° C. for eight minutes by adjusting RPM to 32.
  9. Dump. Sheet off 1525 mm. roll mill. Cool to room temperature.

For Compound 11AB 9.7 phr Silane A (1 pass), 72% fill factor.
  Temperature of sides, rotors, door set at 5° C.
  1. Add SSBR and BR, ram down mix (RDM) 30 seconds at 40 RPM.
  2. Add one-half of the total quantity of silica, all silane, RDM 30 seconds.
  3. Add one-half of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 160° C.
  8. Hold at 160° C. for eight minutes by adjusting RPM to 34.
  9. Dump. Sheet off 1525 mm. roll mill. Cool to room temperature.

For Compound 12AB 9.7 phr Silane A (1 pass), 76% fill factor.
  Temperature of sides, rotors, door set at 5° C.
  1. Add SSBR and BR, ram down mix (RDM) 30 seconds at 40 RPM.
  2. Add one-half of the total quantity of silica, all silane, RDM 30 seconds.
  3. Add one-half of the total quantity of silica, all oil, RDM 30 seconds.
  4. Brush (sweep), RDM 20 seconds.
  5. Brush, RDM 20 seconds.
  6. Add ZnO, stearic acid, wax, 6PPD, carbon black, RDM 30 seconds.
  7. Brush. RPM to 71, RDM to 160° C.
  8. Hold at 160° C. for eight minutes by adjusting RPM to 26.

9. Dump. Sheet off 1525 mm. roll mill. Cool to room temperature.

For Compound 13AB 9.7 phr Silane A (1 pass), 72% fill factor.

Temperature of sides, rotors, door set at 5° C.
1. Add SSBR and BR, ram down mix (RDM) 30 seconds at 40 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 160° C.
8. Hold at 160° C. for eight minutes by adjusting RPM to 37.
9. Dump. Sheet off 1525 mm. roll mill. Cool to room temperature.

For Compound 15AB 9.41 phr Silane A+0.16 phr Silane C (1 pass), 72% fill factor.

Temperature of sides, rotors, door set at 5° C.
1. Add SSBR and BR, ram down mix (RDM) 30 seconds at 40 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 35.
9. Dump. Sheet off 1525 mm. roll mill. Cool to room temperature.

For Compound 16AB 9.12 phr Silane A+0.32 phr Silane C (1 pass), 72% fill factor.

Temperature of sides, rotors, door set at 5° C.
1. Add SSBR and BR, ram down mix (RDM) 30 seconds at 40 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 30.
9. Dump. Sheet off 1525 mm. roll mill. Cool to room temperature.

For Compound 17AB 9.7 phr Silane A+2.0 phr DPG (1 pass), 72% fill factor.

Temperature of sides, rotors, door set at 5° C.
1. Add SSBR and BR, ram down mix (RDM) 30 seconds at 31 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 31.
9. Dump. Sheet off 1525 mm. roll mill. Cool to room temperature.

For Compound 20AB 9.7 phr Silane A+0.16 phr Silane C+2.0 phr DPG (1 pass), 72% fill factor.

Temperature of sides, rotors, door set at 5° C.
1. Add SSBR and BR, ram down mix (RDM) 30 seconds at 41 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 26.
9. Dump. Sheet off 1525 mm. roll mill. Cool to room temperature.

For Compound 21AB 9.7 phr Silane A+2.0 phr DPG (1 pass), 72% fill factor.

Temperature of sides, rotors, door set at 5° C.
1. Add SSBR and BR, ram down mix (RDM) 30 seconds at 31 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 180° C.
8. Hold at 180° C. for eight minutes by adjusting RPM to 31.
9. Dump. Sheet off 1525 mm. roll mill. Cool to room temperature.

For Compound 22AB 7.23 phr Silane A (1 pass), 72% fill factor.

Temperature of sides, rotors, door set at 5° C.
1. Add SSBR and BR, ram down mix (RDM) 30 seconds at 41 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 160° C.

8. Hold at 160° C. for eight minutes by adjusting RPM to 26.
9. Dump. Sheet off 1525 mm. roll mill. Cool to room temperature.

For Compound 23AB 7.23 phr Silane A+2.0 phr DPG (1 pass), 72% fill factor.

Temperature of sides, rotors, door set at 5° C.
1. Add SSBR and BR, ram down mix (RDM) 30 seconds at 41 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 19.
9. Dump. Sheet off 1525 mm. roll mill. Cool to room temperature.

For Compound 24AB 9.7 phr Silane A (1 pass), high ram pressure, 72% fill factor.

Temperature of sides, rotors, door set at 5° C.
1. Add SSBR and BR, ram down mix (RDM) 30 seconds at 41 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 71, RDM to 170° C.
8. Hold at 170° C. for eight minutes by adjusting RPM to 33.
9. Dump. Sheet off 1525 mm. roll mill. Cool to room temperature.

For Compound 25AB 8.05 phr Silane B (1 pass), 72% fill factor.

Temperature of sides, rotors, door set at 5° C.
1. Add SSBR and BR, ram down mix (RDM) 30 seconds at 41 RPM.
2. Add nine-tenths of the total quantity of silica, all silane, RDM 30 seconds.
3. Add one-tenth of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 72, RDM to 160° C.
8. Hold at 160° C. for eight minutes by adjusting RPM to 27.
9. Dump. Sheet off 1525 mm. roll mill. Cool to room temperature.

Second pass for 1 pass compounds, and 3$^{rd}$ pass for 2 pass compounds.
1. Band 600 grams of the compound from the end of the 1$^{st}$ or 2$^{nd}$ pass on a 300 mm. roll mill, roll temperatures 50–60° C.
2. Add 3.66 gm sulfur, 4.45 gm CBS, 5.23 gm DPG.
3. Mix by cutting six times on each side, folding the sides into the center of the mill. Allow mixing time between cuts.
4. Sheet off mill and cool to room temperature.

The following examples are derived from the above work. Compound numbers correspond to those of the mix procedures.

Example 1

This example illustrates the differences in composition 1B (A-1289 7.0 phr, two pass at 160° C.), composition 2B (A-1589 6.2 phr, two pass at 160° C.), and composition 3B (Silane A 9.7 phr, two pass at 160° C.), and 6AB (Silane A 9.7 phr, one pass at 160° C.). It is easily observed that the A-1289 alkoxysilane compound shows superior hysteresis and reinforcement properties when compared to the remaining systems. The Silane A alkoxysilane compound (3B, 2 pass) shows hysteresis characteristics very similar to the A-1289 compound, but is less effective in reinforcement. The Silane A alkoxysilane compound (6AB, 1 pass) shows higher hysteresis and lower reinforcement properties than system 3B. The A-1589 alkoxysilane shows slightly higher hysteresis than 6AB, but its reinforcement behavior is superior to both 3B and 6AB, while being lower than 1B (the A-1289 system).

|  | 1B<br>A-1289<br>2 pass<br>160° C. | 2B<br>A-1589<br>2 pass<br>160° C. | 3B<br>Silane A<br>2 pass<br>160° C. | 6AB<br>Silane A<br>1 pass<br>160° C. |
| --- | --- | --- | --- | --- |
| Properties in the cured state |  |  |  |  |
| Nonlinearity (0–10%) |  |  |  |  |
| G'$_{initial}$ (MPa) | 3.3 | 3 | 3.6 | 4.5 |
| ΔG' (MPa) | 1.65 | 1.4 | 2 | 2.8 |
| G"$_{max}$ (MPa) | 0.39 | 0.38 | 0.41 | 0.55 |
| tan δ$_{max}$ | 0.182 | 0.19 | 0.17 | 0.2 |
| Large strain hysteresis |  |  |  |  |
| 35% DSA | 0.129 | 0.153 | 0.131 | 0.145 |
| Reinforcement |  |  |  |  |
| M10 (MPa) | 5.5 | 5 | 5.13 | 5.79 |
| M100 (MPa) | 4.03 | 3.07 | 3.32 | 3.51 |
| M300 (MPa) | 15.4 | 10.2 | 9 | 9.15 |
| M300/M100 | 3.82 | 3.31 | 2.71 | 2.6 |
| Stress at rupture (MPa) | 27.5 | 28.5 | 22.5 | 20.11 |
| Elongation at rupture (%) | 470 | 610 | 662 | 754 |

Example 2

This example illustrates the benefits of processing the Silane A alkoxysilane compound at higher silanization temperatures in a single Banbury® pass. The comparisons are with the standard 2-pass mixing procedure with the silanization step (thermomechanical step) run at 160° C. (3B). It is observed from the sequence of process variations 6AB to 5AB and then to 4AB that increasing the silanization temperature imparts excellent improvements in both hysteresis and reinforcement properties. Compound 4AB exhibits hysteresis properties equivalent to 3B (2 pass, Silane A alkoxysilane compound) and system 1B (A-1289, 2 pass). In addition, it exhibits slightly superior reinforcing properties.

|  | 3B<br>Silane A<br>2 pass<br>160° C. | 5AB<br>Silane A<br>1 pass<br>180° C. | 5AB<br>Silane A<br>1 pass<br>170° C. | 4AB<br>Silane A<br>1 pass<br>180° C. |
|---|---|---|---|---|
| Properties in the cured state |  |  |  |  |
| Nonlinearity (0–10%) |  |  |  |  |
| $G'_{initial}$ (MPa) | 3.6 | 4.5 | 4.1 | 3.7 |
| $\Delta G'$ (MPa) | 2 | 2.8 | 2.4 | 2.05 |
| $G''_{max}$ (MPa) | 0.41 | 0.55 | 0.475 | 0.43 |
| $\tan \delta_{max}$ | 0.17 | 0.2 | 0.185 | 0.18 |
| Large strain hysteresis |  |  |  |  |
| 35% DSA Reinforcement | 0.131 | 0.145 | 0.14 | 0.133 |
| M10 (MPa) | 5.13 | 5.78 | 5.57 | 5.2 |
| M100 (MPa) | 3.32 | 3.51 | 3.463 | 3.4 |
| M300 (MPa) | 9 | 9.15 | 9.1 | 9.47 |
| M300/M100 | 2.71 | 2.6 | 2.63 | 2.79 |
| Stress at rupture (MPa) | 22.5 | 20.11 | 25.9 | 25.5 |
| Elongation at rupture (%) | 662 | 754 | 750 | 700 |

Example 3

This example demonstrates the effect of silica separation during the mix procedure. In composition 6AB, half of the silica goes in early on with all the silane and, after some incorporation, the ram is raised, following which the remaining half of the silica is added to the mixing chamber with the oil. In an attempt to increase the energy input immediately after silica addition, experiments 9AB and 10AB incorporate more silica in the first addition stage. For 9AB, the ratio of first stage silica/second stage silica addition was 75/25, and for experiment 10AB, it was 90/10. Consequently, as more silica is added in the first step, the power consumed to mix the compound in this step increases significantly. Compounds 9AB and 10AB show dynamic properties similar to compound 6AB at small strains; however, they show some improvement in hysteresis at high strains. The reinforcing properties for all three compounds are similar.

|  | 6AB<br>Silane A<br>1 pass<br>160° C.<br>50/50 Silica | 9AB<br>Silane A<br>1 pass<br>160° C.<br>75/25 Silica | 10AB<br>Silane A<br>1 pass<br>160° C.<br>90/10 Silica |
|---|---|---|---|
| kwh after first stage silica addition | 0.22 | 1.02 | 1.33 |
| kwh after second stage silica addition | 1.11 | 1.06 | 0.91 |
| kwh during silanization | 10 | 8.59 | 8.15 |
| Properties in the cured state |  |  |  |
| Nonlinearity (0–10%) |  |  |  |
| $G'_{initial}$ (MPa) | 4.5 | 4.4 | 4.5 |
| $\Delta G'$ (MPa) | 2.8 | 2.65 | 2.7 |
| $G''_{max}$ (MPa) | 0.55 | 0.51 | 0.545 |
| $\tan \delta_{max}$ | 0.2 | 0.185 | 0.19 |
| Large strain hysteresis |  |  |  |
| 35% DSA Reinforcement | 0.145 | 0.136 | 0.137 |
| M10 (MPa) | 5.79 | 5.65 | 6 |
| M100 (MPa) | 3.51 | 3.58 | 3.6 |
| M300 (MPa) | 9.15 | 9.2 | 9.5 |
| M300/M100 | 2.6 | 2.57 | 2.64 |
| Stress at rupture (MPa) | 20.11 | 27.13 | 26.2 |
| Elongation at rupture (%) | 754 | 776 | 740 |

Example 4

The object of Example 4 is to find an optimum fill factor for the compound during mixing, so as to maximize the benefits in hysteresis and reinforcement. With the control fill factor being 0.67 (experiment 6AB), as in the case of mixing A-1289 alkoxysilane compound, experiments 11AB and 12AB demonstrate higher loadings of 0.72 and 0.76. The net chamber volume is 70.5 liters. With both higher loadings, 0.72 and 0.76, dynamic properties deteriorate slightly. The 0.76 fill factor is higher than optimum since the reinforcement index is negatively affected. The minor flaw of increased dynamic properties at small strain vanishes when using the 90/10 silica separation. Thus, a 0.72 fill factor can be used as a new optimum fill-factor that sustains the superior hysteresis and reinforcement properties.

|  | 6AB<br>Silane A<br>1 pass<br>160° C.<br>0.67 FF<br>50/50 Silica | 11AB<br>Silane A<br>1 pass<br>160° C.<br>0.72 FF<br>50/50 Silica | 12AB<br>Silane A<br>1 pass<br>160° C.<br>0.76 FF<br>50/50 Silica | 13AB<br>Silane A<br>1 pass<br>150° C.<br>0.72 FF<br>90/10 Silica |
|---|---|---|---|---|
| Properties in the cured state |  |  |  |  |
| Nonlinearity (0–10%) |  |  |  |  |
| $G'_{initial}$ (MPa) | 4.5 | 5.25 | 5.2 | 4.5 |
| $\Delta G'$ (MPa) | 2.8 | 3.35 | 3.3 | 2.7 |
| $G''_{max}$ (MPa) | 0.55 | 0.615 | 0.62 | 0.53 |
| $\tan \delta_{max}$ | 0.2 | 0.2 | 0.2 | 0.19 |
| Large strain hysteresis |  |  |  |  |
| 35% DSA Reinforcement | 0.145 | 0.14 | 0.141 | 0.139 |
| M10 (MPa) | 5.79 | 5.8 | 6 | 6.2 |
| M100 (MPa) | 3.51 | 3.7 | 3.58 | 3.7 |
| M300 (MPa) | 9.15 | 9.62 | 9.1 | 9.56 |
| M300/M100 | 2.6 | 2.59 | 2.54 | 2.58 |
| Stress at rupture (MPa) | 20.11 | 26 | 25.5 | 25.8 |
| Elongation at rupture (%) | 754 | 740 | 720 | 720 |

Example 5

In Example 2, it was shown that experiment 4AB (Silane A, 1 pass 180° C.) shows considerable improvements in both hysteresis and reinforcement characteristics when compared to processing these compounds at 160° C. Then, in Examples 3 and 4, it was demonstrated that 90/10 silica separation ratio and a 0.72 fill factor are the optimum process variables that either sustain or improve the mechanical behavior of the mentioned rubber composition. In this example, it is shown that adding small amounts of mercaptosilane imparts good benefits in the rubber composition. In experiment 15AB, 3% of the total weight of Silane A was substituted by Silane C. Similarly, 6% of the total weight of Silane A was substituted by Silane C in composition 16AB. The small amounts of Silane C were simply blended with Silane A and then added into the mixing chamber along with 90% of the silica (first silica addition stage). Considerable improvements result when Silane A is compounded by this method. Experiments 15AB and 16AB both show improved dynamic properties compared to experiment 13AB. In addition, these compounds also result in superior reinforcing properties. With 6% Silane C, the reinforcing properties are even better than composition 4AB. In addition, both force and elongation at rupture increase.

|  | 4AB Silane A 1 pass 180° C. | 13AB Silane A 1 pass 160° C. 0.72 FF 90/10 Silica | 15AB Silane A 1 pass, 170° C. 3% Silane C 0.72 FF 90/10 Silica | 16AB Silane A 1 pass, 170° C. 6% Silane C 0.72 FF 90/10 Silica |
|---|---|---|---|---|
| Properties in the cured state |  |  |  |  |
| Nonlinearity (0–10%) |  |  |  |  |
| G'$_{initial}$ (MPa) | 3.7 | 4.5 | 4.1 | 4.16 |
| ΔG' (MPa) | 2.05 | 2.7 | 2.35 | 2.5 |
| G"$_{max}$ (MPa) | 0.43 | 0.53 | 0.475 | 0.47 |
| tan δ$_{max}$ | 0.18 | 0.19 | 0.18 | 0.19 |
| Large strain hysteresis |  |  |  |  |
| 35% DSA Reinforcement | 0.133 | 0.139 | 0.131 | 0.135 |
| M10 (MPa) | 5.2 | 5.2 | 5.41 | 4.93 |
| M100 (MPa) | 3.4 | 3.7 | 3.71 | 3.44 |
| M300 (MPa) | 9.47 | 9.56 | 10.01 | 9.85 |
| M300/M100 | 2.79 | 2.58 | 2.69 | 2.86 |
| Stress at rupture (MPa) | 25.5 | 25.8 | 25 | 27 |
| Elongation at rupture (%) | 700 | 720 | 880 | 725 |

Example 6

This example demonstrates the use of small amounts of DPG (di-phenyl guanidine) early on along with a 90% silica addition step. Experiment 17AB with 2 phr DPG is run at a thermal step of 170° C., while experiment 21AB with 2 phr DPG is run at 180° C. Quite a surprising improvement results in hysteresis and reinforcement characteristics with this method of mixing. Compositions 17AB and 21 AB show excellent improvement trends in both directions, dynamic hysteresis and polymer silica adhesion properties. Another exceptional benefit is that the elongation at rupture is not significantly affected, but the force required to rupture the material increases with addition of DPG.

|  | 4AB Silane A 1 pass 180° C. | 13AB Silane A 1 pass 180° C. 0.72 FF 90/10 Silica | 17AB Silane A 1 pass, 170° C. 2 phr DPG 0.72 FF 90/10 Silica | 21AB Silane A 1 pass, 180° C. 2 phr DPG 0.72 FF 90/10 Silica |
|---|---|---|---|---|
| Properties in the cured state |  |  |  |  |
| Nonlinearity (0–10%) |  |  |  |  |
| G'$_{initial}$ (MPa) | 3.7 | 4.5 | 4.15 | 3.3 |
| ΔG' (MPa) | 2.05 | 2.7 | 2.4 | 1.7 |
| G"$_{max}$ (MPa) | 0.43 | 0.53 | 0.49 | 0.4 |
| tan δ$_{max}$ | 0.18 | 0.19 | 0.19 | 0.177 |
| Large strain hysteresis |  |  |  |  |
| 35% DSA Reinforcement | 0.133 | 0.139 | 0.131 | 0.124 |
| M10 (MPa) | 5.2 | 6.2 | 5.55 | 5.52 |
| M100 (MPa) | 3.4 | 3.7 | 3.92 | 3.9 |
| M300 (MPa) | 9.47 | 9.58 | 11.5 | 11.6 |
| M300/M100 | 2.79 | 2.58 | 2.93 | 2.98 |
| Stress at rupture (MPa) | 25.5 | 25.8 | 27 | 27 |
| Elongation at rupture (%) | 700 | 720 | 680 | 670 |

Example 7

This example demonstrates the changes in the Silane A alkoxysilane compound that result from a lowered silane loading. As indicated, experiment 22AB comprises 75% of full Silane A loading (9.7 phr) and the silanization step is run at 160° C., whereas experiment 23AB tests the effect of added DPG (2 phr) and a 170° C. temperature (silanization step) at lower loading. Results from experiment 22AB indicate that hysteresis is similar to 6AB, which indicates that 75% silane loading is sustainable from the hysteresis point of view. On the other hand, the reinforcing properties deteriorate slightly with lowered silane loading in spite of increased 300% modulus. The addition of DPG and raising the thermal step temperature to 170° C. (experiment 23AB) improves the reinforcing index, but at the expense of a slight deterioration of hysteresis characteristics.

|  | 6AB Silane A 1 pass 160° C. 0.67 FF 50/50 Silica | 17AB Silane A 1 pass 170° C. 2 phr DPG 0.72 FF 90/10 Silica | 22AB Silane A (75% loading) 160° C. 0.72 FF 90/10 Silica | 23AB Silane A (75% loading) 170° C. 2 phr DPG 0.72 FF 90/10 Silica |
|---|---|---|---|---|
| Properties in the cured state |  |  |  |  |
| Nonlinearity (0–10%) |  |  |  |  |
| G'$_{initial}$ (MPa) | 4.5 | 4.15 | 4.4 | 5 |
| ΔG' (MPa) | 2.8 | 2.4 | 2.75 | 3.2 |

-continued

|  | 6AB Silane A 1 pass 160° C. 0.67 FF 50/50 Silica | 17AB Silane A 1 pass 170° C. 2 phr DPG 0.72 FF 90/10 Silica | 22AB Silane A (75% loading 160° C. 0.72 FF 90/10 Silica | 23AB Silane A (75% loading 170° C. 2 phr DPG 0.72 FF 90/10 Silica |
|---|---|---|---|---|
| $G''_{max}$ (MPa) | 0.55 | 0.49 | 0.52 | 0.575 |
| tan $\delta_{max}$ | 0.2 | 0.19 | 0.2 | 0.2 |
| Large strain hysteresis |  |  |  |  |
| 35% DSA Reinforcement | 0.145 | 0.131 | 0.145 | 0.138 |
| M10 (MPa) | 5.79 | 5.55 | 6.5 | 6.6 |
| M100 (MPa) | 3.51 | 3.92 | 3.658 | 4.04 |
| M300 (MPa) | 9.15 | 11.5 | 9.5 | 11.54 |
| M300/M100 | 2.6 | 2.83 | 2.59 | 2.856 |

-continued

|  | 6AB Silane A 1 pass 160° C. 0.67 FF 50/50 Silica | 17AB Silane A 1 pass 170° C. 2 phr DPG 0.72 FF 90/10 Silica | 22AB Silane A (75% loading 160° C. 0.72 FF 90/10 Silica | 23AB Silane A (75% loading 170° C. 2 phr DPG 0.72 FF 90/10 Silica |
|---|---|---|---|---|
| Stress at rupture (MPa) | 20.11 | 27 | 25.5 | 26 |
| Elongation at rupture (%) | 754 | 680 | 710 | 640 |

Example 8

This Example demonstrates all the improved Silane A alkoxysilane runs that show acceptable hysteresis close or equal to A-1289 alkoxysilane based rubber composition and improving trends from the reinforcement perspective. The secondary control is A-1589 alkoxysilane (2 pass mix). It is surprisingly noticed that experiment 20AB (9.7 phr Silane A+0 16 phr Silane C+2 phr DPG) shows the best set of properties while processing with Silane A compound. Hysteresis is superior to any other Silane A compound and similar to A-1289 alkoxysilane compound (1B). At the same time, it also demonstrates higher silica-rubber coupling as indicated by its reinforcing index (2.97) that is almost similar to the secondary control (A-1589 alkoxysilane compound). It also exhibits excellent force and elongation at rupture.

|  | 1AB A-1289 2 pass 160° C. | 2AB A-1589 2 pass 160° C. | 4AB Silane A 1 pass 180° C. | 16AB Silane A 1 pass 70° C. 6% Silane C 0.72 FF 90/10 Silica | 21AB Silane A 1 pass 180° C. 2 phr DPG 0.72 FF 90/10 Silica | 20AB Silane A 1 pass 170° C. 3% Silance C 2 phr DPG 0.72 FF 90/10 Silica |
|---|---|---|---|---|---|---|
| Properties in the cured state |  |  |  |  |  |  |
| Nonlinearity (0–10%) |  |  |  |  |  |  |
| $G'_{intital}$(MPa) | 3.3 | 3 | 3.7 | 4.15 | 3.3 | 3.4 |
| $\Delta G'$(MPa) | 1.65 | 1.4 | 2.06 | 2.5 | 1.7 | 1.5 |
| $G''_{max}$(MPa) | 0.38 | 0.38 | 0.43 | 0.47 | 0.4 | 0.43 |
| tan $\delta_{max}$ | 0.182 | 0.19 | 0.18 | 0.19 | 0.177 | 0.19 |
| Large strain hysteresis |  |  |  |  |  |  |
| 35% DSA Reinforcement | 0.129 | 0.153 | 0.133 | 0.135 | 0.124 | 0.13 |
| M10 (MPa) | 5.5 | 5 | 5.2 | 4.93 | 5.52 | 5.96 |
| M100 (MPa) | 4.03 | 3.07 | 3.4 | 3.44 | 3.9 | 4.103 |
| M300 (MPa) | 15.4 | 10.2 | 8.47 | 9.89 | 11.6 | 12.2 |
| M300/M100 | 3.82 | 3.31 | 2.78 | 2.80 | 3.98 | 2.97 |
| Stress at rupture (MPa) | 27.5 | 25.6 | 25.5 | 27 | 27 | 28.5 |
| Elongation at rupture (%) | 470 | 610 | 700 | 725 | 570 | 680 |

The following Examples were carried out in small laboratory equipment, which is described below.

"B" Banbury® is a 1.7 liter internal mixer, manufactured by the Farrel Corp. It has standard sigma tangential rotors.

Brabender Plasti-Corder® is a 60 cc mixer, manufactured by Brabender Instruments. The mixing blades are described as "roller blades" by Brabender.

The following formulation was used. It is the same as described for Examples 1 to 8, except that the silane is fixed.

BASIC FORMULATION

| PARTS | INGREDIENT | PRODUCT NAME | SUPPLIER |
|---|---|---|---|
| 75 | Solution SBR | SOLFLEX 1216 | Goodyear |
| 25 | Polybutadiene | BUDENE 1207 | Goodyear |
| 80 | Silica | ZEOSIL 1165MP | Rhodia |
| 32.5 | Processing Oil | SUNDEX 8125 | Sun Oil |
| 2.5 | Zinc Oxide | KADOX 720C | Zinc Corp. |
| 1.0 | Stearic Acid | INDUSTRENE R | Witco |
| 2.0 | 6PPD Antioxidant | SANTOFLEX 13 | Flexys |
| 1.5 | Microwax | M4067 | Moore & Munger |
| 3.0 | Carbon Black | N-330 | Huber |
| 1.4 | Sulfur | Rubbermakers 104 | Harwick |
| 1.7 | CBS | SANTOCURE | Flexys |
| 2.0 | DPG | PERKACIT DPG-C | Flexys |
| 9.7 | SILANE A | — | OSi Specialties |

Mix Procedure

B Banbury, Full Cooling Water on Rotors and Doors, Temperature ~15–20° C. Formulation Based on 389 gm SSBR 1. Add SSBR and BR, ram down mix (RDM) 30 seconds at 116 RPM.
2. Add one-half of the total quantity of silica, all silane, intent mercaptosilane activators, if required and RDM 30 seconds.
3. Add one-half of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 155, RDM to 160° C.
8. Hold at 160° C. for eight minutes by adjusting RPM as necessary.
9. Dump. Sheet off 300 mm. roll mill. Cool to room temperature.

Sulfur and Accelerator Addition

1. Band 600 grams of compound from above on 300 mm. roll mill, roll temperatures 50–60° C.
2. Add 3.66 gm sulfur, 4.45 gm CBS, 5.23 gm DPG, latent mercaptosilane activators as shown and if required.
3. Mix by cutting six times on each side, folding the sides into the center of the mill. Allow mixing time between cuts.
4. Sheet off mill and cool to room temperature.

Two mm. test plaques were cured t90 @149° C., as determined by the Oscillating Disc Rheometer.

In the following Examples, preparation and testing of the samples are the same as in Examples 1 to 8.

Example 9

Six activators were added in the accelerator/sulfur addition step using the compound described above. In the compounds where three and nine parts of liquid activators were added, a corresponding amount of oil was removed from the compound. Samples were cured as described.

| Activator | 100% Modulus, MPa | 300% Modulus, MPa | 300%/100% |
|---|---|---|---|
| None | 2.00 | 10.27 | 5.1 |
| 0.5 phr Triamino-bispropylamine | 1.41 | 7.58 | 5.4 |
| 0.5 phr Diethylene Triamine | 1.55 | 8.57 | 5.5 |
| 0.5 phr Triethylene Amine | 1.59 | 8.76 | 5.5 |
| 3.0 phr Glycerol | 1.79 | 10.27 | 5.7 |
| 9.0 phr Glycerol | 1.79 | 10.20 | 5.7 |
| 9.0 phr Ethylene Glycol | 1.86 | 10.93 | 5.9 |
| 9.0 phr Trimethylol-Propane | 1.76 | 9.96 | 5.7 |

All of the activators increased the reinforcing index (300% modulus/100% Modulus).

Example 10

The formulation was the same as in Example 9. A base compound was prepared as follows.

Note that this procedure does not have the thermal step (eight minutes at 160° C.) as in Example 9.

B Banbury, full cooling water on rotors and doors, temperature ~15–20° C.

Formulation based on 389 gm SSBR

1. Add SSBR and BR, ram down mix (RDM) 30 seconds at 116 RPM.
2. Add one-half of the total quantity of silica, all silane, RDM 30 seconds.
3. Add one-half of the total quantity of silica, all oil, RDM 30 seconds.
4. Brush (sweep), RDM 20 seconds.
5. Brush, RDM 20 seconds.
6. Add ZnO, stearic acid, wax, 6PPD, carbon black, RDM 30 seconds.
7. Brush. RPM to 155, RDM to 160° C.
8. Dump. Sheet off 300 mm. roll mill. Cool to room temperature.

A portion of the compound had one or three parts DPG added.

The thermal step was then run in a Brabender Plasti-Corder® as shown below. A #6 roller head was used, with a 60 gram charge. Sulfur and accelerators were then added as above on a roll mill.

| DPG, phr | none | 1 | 3 | none | 1 | 3 |
|---|---|---|---|---|---|---|
| 8 minutes @ 165° C. | X | X | X | | | |
| @ 175° C. | | | | X | X | X |
| 100% Modulus, MPa | 1.76 | 1.79 | 1.79 | 1.72 | 1.86 | 1.86 |

-continued

| DPG, phr | none | 1 | 3 | none | 1 | 3 |
|---|---|---|---|---|---|---|
| 300% Modulus, MPa | 9.89 | 10.69 | 10.72 | 9.82 | 11.65 | 11.65 |
| 300%/100% | 5.6 | 6.0 | 6.0 | 5.7 | 6.3 | 5.9 |

DPG improved the reinforcement index at both processing temperatures.

Example 11

The base compound was prepared as in Example 10. Two other potential activators and a mercaptan were added to 60 gram portions of the base compound. The activators were tetrabenzylthiuramdisulfide (Benzyl Tuex®) and Zinc dibenzyldithiocarbamate (Arazate®), both from Uniroyal Chemical. The mercaptosilane was 3-mercaptopropyltrimethoxysilane, Silane C, from OSi Specialties. A thermal step of eight minutes at 175° C. was conducted on the samples using the Brabender Plasti-Corder® as in Example 10. The samples were then put on a roll mill, and the sulfur and accelerators were added as in Example 10. Samples that had the activators and mercaptan that were not subjected to a thermal step were tested as controls.

| Activator | 8 min. @ 175° C. | 100% Modulus, MPa | 300% Modulus, MPa | 300%/100% |
|---|---|---|---|---|
| None | yes | 1.69 | 9.24 | 5.5 |
| 1.0 DPG | yes | 1.79 | 11.10 | 6.2 |
| 1.0 TBTD | yes | 2.48 | 12.86 | 5.2 |
| 1.0 TBTD | no | 2.52 | 14.93 | 5.9 |
| 1.0 ZBDC | yes | 2.45 | 13.48 | 5.5 |
| 1.0 ZBDC | no | 2.38 | 12.72 | 5.3 |
| 0.5 Silane C | yes | 1.76 | 10.48 | 6.0 |
| 1.0 Silane C | yes | 1.83 | 11.65 | 6.4 |

The TBTD and ZBDC both increased the low strain modulus significantly, indicating an undesirable increase in bulk crosslinking. The DPG and mercaptosilane increased the low strain modulus slightly, and the high strain modulus significantly, indicating superior filler-polymer coupling through the silane. Clearly, the DPG and mercaptosilane are an improvement.

Example 12

This example demonstrates the usefulness of hydroxy group-containing compounds as latent-mercaptosilane activators. The compounds used were glycerol, diethylene glycol, and trimethylol propane. In theory, these compounds should assist in removing the carboxylate group from Silane A.

The thermal steps for the compounds containing these additives were run at both 160° and 170° C. The control was Silane A run at 170° C., which had been found to provide the best results of those previously tested without additives.

All three of the hydroxy group-containing compounds exhibited properties superior to additive-free Silane A when processed at 170° C., but properties at 160° C. were inferior. With each of the compounds, the scorch time was reduced (but was still slightly better than Silquest A-1289) without affecting the viscosity. All three also improved heat buildup, but reduced abrasion resistance. The abrasion reduction is believed to be due to a plasticizing effect provided by the additives and could probably is be improved by reduction in oil loading. Further, reinforcing indices and dynamic properties are all improved with the hydroxy group-containing compounds when processed at 170° C. The testing results are shown in the following table.

| Run Number | 1 | 2 | 3 | 4 | 5 | 6 | 7 | 8 | 9 |
|---|---|---|---|---|---|---|---|---|---|
| Silane A A-1891 | 9.7 | 9.7 | 9.7 | 9.7 | 9.7 | 9.7 | 9.7 | 9.7 | 9.7 |
| DPG | | 2 | 2 | | | | | | |
| Triethylene tetramine | | | | 2 | 2 | | | | |
| Diethylene triamine | | | | | | 2 | 2 | | |
| 3,B'-Iminobis-1-propyl amine | | | | | | | | 2 | 2 |
| Glycerol | | | | | | | | | |
| Diethylene glycol | | | | | | | | | |
| Trimethylolpropane | | | | | | | | | |
| Thermal step temp. C. | 170 | 160 | 170 | 160 | 170 | 160 | 170 | 160 | 170 |
| Mooney Viscosity @ 100° C. | | | | | | | | | |
| MIL1+4 | 53 | 55 | 55 | 57 | 57 | 56 | 56 | 58 | 61 |
| Mooney Scorch @ 135° C. | | | | | | | | | |
| $M_v$ | 23 | 25 | 26 | 28 | 29 | 28 | 28 | 30 | 31 |
| MS1+, $t_3$, minutes | 8.4 | 5.9 | 6.3 | 4.4 | 4.5 | 3.6 | 3.2 | 2.6 | 2.9 |

-continued

| | | | | | | | | | |
|---|---|---|---|---|---|---|---|---|---|
| MS1+, $t_{18}$, minutes | 10.8 | 8.0 | 8.6 | 5.6 | 5.4 | 4.7 | 4.2 | 3.5 | 3.8 |
| ODR @ 149° C., 1° arc, 30 minute timer | | | | | | | | | |
| $M_L$, in.-lb. | 6.5 | 6.5 | 6.6 | 6.8 | 7.1 | 6.9 | 6.8 | 7.0 | 2.5 |
| $M_H$, in.-lb. | 5.9 | 27.3 | 26.5 | 24.9 | 25.1 | 24.5 | 23.0 | 24.0 | 24.9 |
| $t_{s1}$, minutes | 5.1 | 3.1 | 4.1 | 2.8 | 2.6 | 2.3 | 2.0 | 1.8 | 1.9 |
| t90, minutes | 9.3 | 6.3 | 7.8 | 7.0 | 7.0 | 8.3 | 10.8 | 9.0 | 9.0 |

| Run Number | 10 | 11 | 12 | 13 | 14 | 15 | 16 | 17 |
|---|---|---|---|---|---|---|---|---|
| Silane A | 9.7 | 9.7 | 9.7 | 9.7 | 9.7 | 9.7 | 9.7 | 9.7 |
| A1891 | | | | | | | 0.97 | 1.94 |
| DPG | | | | | | | | |
| Triethylenetetramine | | | | | | | | |
| Diethylenetriamine | | | | | | | | |
| Iminololspropy-lamine | | | | | | | | |
| Glycerol | 2 | 2 | | | | | | |
| Dyethylene glycol | | | 2 | 2 | | | | |
| Trimethylol propane | | | | | 2 | 2 | | |
| Thermal step temp. C. | 160 | 170 | 160 | 170 | 160 | 170 | 170 | 170 |
| Mooney Viscosity @ 100° C. | | | | | | | | |
| MlL1+4 | 57 | 56 | 54 | 28 | 54 | 57 | 58 | 62 |
| Mooney Scorch @ 135° C. | | | | | | | | |
| $M_v$ | 26 | 28 | 25 | 27 | 25 | 28 | 20 | 35 |
| MS1+, $t_3$, minutes | 5.4 | 4.7 | 6.6 | 6.6 | 6.9 | 6.8 | 6.8 | 4.5 |
| MS1+, $t_{18}$, minutes | 7.2 | 6.2 | 8.6 | 8.6 | 8.7 | 8.6 | 8.6 | 5.9 |
| ODR @ 149° C., 1° arc, 30 minute timer | | | | | | | | |
| $M_L$, in.-lb. | 6.8 | 6.8 | 6.4 | 6.6 | 6.1 | 6.6 | 7.2 | 7.6 |
| $M_H$, in.-lb. | 26.4 | 26.2 | 26.4 | 26.2 | 26.6 | 26.3 | 25.8 | 25.7 |
| $t_{s1}$, minutes | 3.5 | 3.1 | 4.1 | 4.8 | 4.4 | 4.4 | 4.1 | 3.1 |
| t90, minutes | 6.8 | 6.1 | 7.5 | 7.6 | 7.8 | 7.4 | 8.0 | 6.4 |

| Run Number | 1 | 2 | 3 | 4 | 5 | 6 | 7 | 8 | 9 |
|---|---|---|---|---|---|---|---|---|---|
| Physical Properties, cured 190 @ 149° C. | | | | | | | | | |
| Hardness, Shore A | 53 | 53 | 53 | 50 | 48 | 50 | 47 | 51 | 50 |
| Elongation, % | 540 | 560 | 500 | 530 | 500 | 540 | 540 | 570 | 530 |
| 25% Modulus, psi. | 97 | 105 | 108 | 104 | 104 | 102 | 101 | 106 | 104 |
| 100% Modulus, psi. | 231 | 246 | 259 | 230 | 236 | 218 | 213 | 225 | 227 |
| 300% Modulus psi. | 1392 | 1401 | 1634 | 1403 | 1518 | 1218 | 1304 | 1232 | 1408 |
| Tensile, psi. | 3520 | 3520 | 3590 | 3610 | 3500 | 3400 | 3450 | 3460 | 3630 |
| 300%/25% | 14.4 | 13.3 | 15.1 | 13.5 | 14.6 | 11.9 | 12.9 | 11.6 | 13.5 |
| 300%/100 | 6.0 | 5.7 | 6.3 | 6.1 | 6.4 | 5.6 | 6.1 | 5.5 | 6.2 |
| DIN Abrasion, $mm^3$ | 97 | 115 | 132 | 137 | 128 | 125 | 157 | 134 | 137 |
| Heat Build-up @ 212° F., 17.5% compression, 143 psi, static load | | | | | | | | | |
| Delta T, F ° | 32 | 27 | 27 | 27 | 27 | 30 | bin cured | bin cured | bin cured |
| Permanent set, % | 10.0 | 5.4 | 6.3 | 8.4 | 5.3 | 6.5 | | | |
| Dynamic Properties in the cured state | | | | | | | | | |
| Non-linearity (0–10%) | | | | | | | | | |
| $G'_{initial}$(MPa) | 1.97 | 2.18 | 1.95 | 1.97 | 1.65 | 1.92 | 1.97 | 2.45 | 1.73 |
| $\Delta G'$(MPa) | 0.59 | 0.58 | 0.49 | 0.58 | 0.35 | 0.64 | 0.64 | 0.96 | 0.37 |
| $G''_{max}$(MPa) | 0.192 | 0.191 | 0.168 | 0.178 | 0.143 | 0.185 | 0.204 | 0.137 | 0.146 |
| $\tan\delta_{max}$ | 0.119 | 0.18 | 0.1 | 0.108 | 0.096 | 0.115 | 0.117 | 0.271 | 0.097 |
| Large strain hysteresis | | | | | | | | | |
| 35% DSA | 0.090 | 0.076 | 0.072 | 0.075 | 0.075 | 0.086 | 0.088 | 0.094 | 0.075 |

| Run Number | 10 | 11 | 12 | 13 | 14 | 15 | 16 | 17 |
|---|---|---|---|---|---|---|---|---|
| Physical Properties, cured 190 @ 149° C. | | | | | | | | |
| Hardness, Shore A | 52 | 52 | 52 | 52 | 53 | 52 | 51 | 52 |
| Elongation, % | 530 | 450 | 530 | 460 | 520 | 460 | 450 | 440 |

-continued

| | | | | | | | | |
|---|---|---|---|---|---|---|---|---|
| 25% Modulus, psi. | 115 | 112 | 110 | 112 | 114 | 109 | 103 | 105 |
| 100% Modulus, psi. | 257 | 275 | 254 | 277 | 271 | 269 | 255 | 259 |
| 300% Modulus psi. | 1509 | 1784 | 1533 | 1768 | 1579 | 1739 | 1666 | 1753 |
| Tensile, psi. | 3500 | 3290 | 3630 | 3430 | 3380 | 3390 | 3110 | 3260 |
| 300%/25% | 13.1 | 15.9 | 13.9 | 15.8 | 13.9 | 16.0 | 16.2 | 16.7 |
| 300%/100 | 5.9 | 6.5 | 6.0 | 6.4 | 5.8 | 6.5 | 6.5 | 6.8 |
| DIN Abrasion, mm$^3$ | | | | | | | | |
| Heat Build-up @ 212° F., 17.5% compression, 143 psi, static load | | | | | | | | |
| Delta T, F° | 28 | 29 | 29 | 27 | 27 | 26 | 29 | bin |
| Permanent set, % | 5.2 | 6.8 | 6.5 | 5.3 | 5.4 | 5.1 | 5.4 | cured |
| Dynamic Properties in the cured state | | | | | | | | |
| Non-linearity (0–10%) | | | | | | | | |
| G'$_{initial}$(MPa) | 1.93 | 1.95 | 2.06 | 1.68 | 2.30 | 1.51 | 1.62 | 2.05 |
| ΔG'(MPa) | 0.44 | 0.53 | 0.62 | 0.32 | 0.79 | 0.23 | 0.38 | 0.72 |
| G"$_{max}$(MPa) | 0.160 | 0.184 | 0.193 | 0.142 | 0.23 | 0.126 | 0.155 | 0.198 |
| tanδ$_{max}$ | 0.096 | 0.113 | 0.166 | 0.095 | 0.127 | 0.091 | 0.111 | 0.122 |
| Large strain hysteresis | | | | | | | | |
| 35% DSA | 0.078 | 0.086 | 0.083 | 0.078 | 0.087 | 0.080 | 0.091 | 0.092 |

Note: bin curing is at 10 weeks aging

In view of the many changes and modifications that can be made without departing from principles underlying the invention, reference should be made to the appended claims for an understanding of the scope of the protection afforded the invention.

What is claimed is:

1. A process for the preparation of a rubber composition consisting essentially of the steps of:

A) thermomechanically mixing in a first pass:
   1) at least one sulfur vulcanizable rubber;
   2) at least one latent mercaptosilane coupling agent;
   3) at least one filler; and
   4) at least one additional mercaptan, said additional mercaptan being a mercaptosilane selected from the group consisting of compounds of the structure (HS—)$_j$G(—SiX$_3$)$_i$;  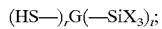

B) bringing the temperature of the first pass mix from about 140° C. to about 200° C. over a period of 1 to 20 minutes;
   thereby forming a nonproductive first mixture;

C) thermomechanically mixing the nonproductive first mixture in a second pass, optionally in the presence of at least one curing agent, at a temperature of from about 25 to about 100° C. for a period of from about 1 to about 30 minutes; thereby forming a productive second mixture;

D) adding at least one latent-mercaptosilane activator in step A), step C), or both step A) and step C);

E) shaping the second mixture; and then

F) curing the second mixture at a temperature between about 130° C. to about 200° C. for a period of from about 5 to about 60 minutes.

2. The process of claim 1 wherein the filler in step A) is pre-treated with at least a portion of the latent-mercaptosilane coupling agent.

3. The process of claim 1 wherein the sulfur vulcanizable rubber is selected from the group consisting of:

A) conjugated diene homopolymers and copolymers;
   B) copolymers of at least one conjugated diene and at least one aromatic vinyl compound;
   C) natural rubber; and
   D) ethylene-propylene copolymers and terpolymers.

4. The process of claim 3 wherein the sulfur vulcanizable rubber is selected from the group consisting of cis-1,4-polyisoprene rubber, styrene/butadiene copolymer rubber, 3,4-polyisoprene rubber, isoprene/butadiene rubber, styrene/isoprene/butadiene terpolymer rubber, cis-1,4-polybutadiene, vinyl polybutadiene rubber, styrene/isoprene copolymers, styrene/butadiene/acrylonitrile terpolymer rubber, butadiene/acrylonitrile copolymer rubber, and mixtures thereof.

5. The process of claim 4 wherein the sulfur vulcanizable rubber is solution-prepared styrene-butadiene rubber.

6. The process of claim 1 wherein the latent mercaptosilane coupling agent is selected from the group consisting of:

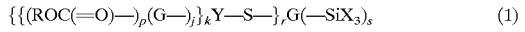 (1)

and

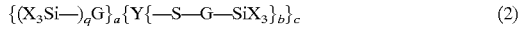 (2)

wherein:
R is a moiety comprising from 1 to 18 carbon atoms, which, in each occurrence is independently selected from the group consisting of hydrogen; straight, cyclic, or branched alkyl that may or may not contain unsaturation; alkenyl groups; aryl groups; arenyl groups; and aralkyl groups;

each occurrence of G is independently a fragment, obtained by substitution of a quantity of hydrogen atoms given by p, of any hydrocarbon or oxa-, aza-, and/or cyano-substituted hydrocarbon, G$_1$, having from 1 to 18 carbon atoms;

with the proviso that if G is univalent, G can be a hydrogen atom;

each occurrence of X is a moiety independently selected from the group consisting of RO—, RC(=O)O—, R$_2$G=NO—, R$_2$NO—R$_2$N—, —R, and —(OSiR$_2$)$_t$(OSiR$_3$);

wherein each R and G is as described above and at least one X is not —R;

Y is a polyvalent species $(Q)_zA(=E)$;

each occurrence of O is independently selected from the group consisting of oxygen, sulfur, and (—NR—);

each occurrence of A is independently selected from the group consisting of carbon, sulfur, phosphorus, and sulfonyl;

each occurrence of E is independently selected from the group consisting of oxygen, sulfur, and NR; and the following variables are integers, each occurrence of which is independent:
a is 0 to 7;
b is 1 to 3;
c is 1 to 6;
j is 0 to 1, but is 0 only if p is 1;
k is 1 to 2;
p is 0 to 5;
q is 0 to 6;
r is 1 to 3;
s is 1 to 3;
t is 0 to 5; and
z is 0 to 2;

provided that:
(1) if j is 0, then p is 1;
(2) if A is carbon, sulfur, or sulfonyl, then:
  (i) at least one of a and c is equal to 1;
  (ii) a+b=2; and
  (iii) k=1;
(3) if A is phosphorus, then
  A. the value of a does not exceed 2c; and
  B k=2.

7. The process of claim 6 wherein Y is —C(=O)—.

8. The method of claim 1, wherein the latent mercaptosilane coupling agent is selected from the group consisting of 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propylthioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propylthioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl-1-ethyl)-4-thioacetylnorbornene; 1-(1-oxo-2-thia-5-triethoxysilylpenyl)benzoic acid; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctoate; 3-triethoxysilyl-1-propyl thiopalmitate; 3-triethoxysilyl-1-propyl thiooctoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; tris-(3-triethoxysilyl-1-propyl)trithiophosphate; bis-(3-triethoxysilyl-1-propyl) methyldithiophosphonate; bis-(3-triethoxysilyl-1-propyl) ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl) methyltrithiophosphonate; bis-(3-triethoxysilyl-1-propyl) ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl) ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulphate; 3-triethoxysilyl-1-propylmethanethiosulphonate; 3-triethoxysilyl-1-propylethanethiosulphonate; 3-triethoxysilyl-1-propylbenzenethiosulphonate; 3-triethoxysilyl-1-propyltoluenethiosulphonate; 3-triethoxysilyl-1-propylnaphthalenethiosulphonate; 3-triethoxysilyl-1-propylxylenethiosulphonate; triethoxysilylmethylmethylthiosulphate; triethoxysilylmethylmethanethiosulphonate; triethoxysilylmethylethanethiosulphonate; triethoxysilylmethylbenzenethiosulphonate; triethoxysilylmethyltoluenethiosulphonate; triethoxysilylmethylnaphthalenethiosulphonate; and triethoxysilylmethylxylenethiosulphonate.

9. The process of claim 8 wherein each X is RO—, the silane is of formula (1), r=1, and s=1.

10. The process of claim 1 wherein the latent-mercaptosilane activator is selected from the group consisting of:

  (5)

  (6)

and

  (7)

wherein:
each Z is independently selected from the group consisting of an oxygen atom, NH, and NR;
each M is independently selected from the group consisting of a hydrogen atom and R;
each R is chosen independently from hydrogen, straight, cyclic, or branched alkyl that may or may not contain unsaturation, alkenyl groups, aryl groups, and aralkyl groups, with each R containing from 1 to 18 carbon atoms;
each U is independently a fragment, obtained by substitution of a quantity of hydrogen atoms given by 2q+2, of any hydrocarbon or oxa-, aza-, and/or cyano-substituted hydrocarbon, $U_1$, having from 1 to 30 carbon atoms;

each L is independently a fragment, obtained by substitution of a quantity of hydrogen atoms given by c, of any hydrocarbon or oxa-, aza-, and/or cyano-substituted hydrocarbon, $L_1$, having from 1 to 30 carbon atoms;

m is an integer of from 0 to 500;

c is 1 to 6; and q is 0 to 6.

11. The process of claim 9 wherein the latent-mercaptosilane activator is selected from the group consisting of N,N'-diphenylguanidine; the ethanolamines; the ethyleneamines; ethylene glycol and the polyethylene glycols; propylene glycol and the polypropylene glycols; mixed ethylene-propylene glycols; any of the aforementioned glycols terminated on one end by an alkyl group; glycerol; trimethylolalkanes; pentaerythritol; any of the anilines and phenylene diamines; phenol; catechol; dihydroquinone; resorcinol; aminophenols; 1,3-diaminopropane; 1,4-diaminobutane; 1,5-diaminopentane; 1,6-diaminohexane; N-(3-aminopropyl)-1,3-propanediamine (3,3'-iminobispropylamine); 3-amino-1-propanol; imidazole; benzimidazole; aminobenzimidazole; pyrrole; indole; pyrazole; triazole; benzotriazole; and isomers mixtures of any of the foregoing.

12. The process of claim 9 wherein the latent-mercaptosilane activator is selected from the group consisting of N,N'-diphenylguanidine; glycerol; N-(3-aminopropyl)-1,3-propanediamine (3,3'-iminobispropylamine); diethylene triamine; triethylene tetramine; trimethylolpropane; and ethylene glycol.

13. The process of claim 11 wherein the latent-mercaptosilane activator is N,N'-diphenylguanidine.

14. The process of claim 1 wherein the filler is selected from the group consisting of silica, titanium dioxide, aluminosilicate, alumina, clays, talc, carbon black, and mixtures of the foregoing.

15. The process of claim 1 wherein the additional mercaptan is selected from the group consisting of 3-mercapto-1-propyltriethoxysilane, 2-mercapto-1-ethyltriethoxysilane, mercaptomethyltriethoxysilane, 8-mercapto-1-octyltriethoxysilane, 10-mercapto-1-decyltriethoxysilane, 1-mercapto-1-ethyltriethoxysilane, 3-mercapto-1-propylmethyldiethoxysilane, 3-mercapto-1-propyldimethylethoxysilane, 3-mercapto-1-propyltrimethoxysilane, 2-mercapto-1-ethyltrimethoxysilane, mercaptomethyltrimethoxysilane, 8-mercapto-1-octyltrimethoxysilane, 10-mercapto-1-decyltrimethoxysilane, 1-mercapto-1-ethyltrimethoxysilane, 3-mercapto-1-propylmethyldimethoxysilane, 3-mercapto-1-propyldimethylmethoxysilane, 3-mercapto-1-propyltripropoxysilane, 3-mercapto-1-propyltriisopropoxysilane, 3-mercapto-1-propyltributoxysilane, and mixtures of the foregoing.

* * * * *